(12) United States Patent
Easwar et al.

(10) Patent No.: US 7,847,833 B2
(45) Date of Patent: *Dec. 7, 2010

(54) DIGITAL CAMERA DEVICE PROVIDING IMPROVED METHODOLOGY FOR RAPIDLY TAKING SUCCESSIVE PICTURES

(75) Inventors: Venkat Easwar, Cupertino, CA (US); Eric Bodnar, Santa Cruz, CA (US)

(73) Assignee: VeriSign, Inc., Dulles, VA (US)

( * ) Notice: Subject to any disclaimer, the term of this patent is extended or adjusted under 35 U.S.C. 154(b) by 108 days.

This patent is subject to a terminal disclaimer.

(21) Appl. No.: 12/116,179

(22) Filed: May 6, 2008

(65) Prior Publication Data

US 2008/0239093 A1 Oct. 2, 2008

Related U.S. Application Data

(63) Continuation of application No. 09/779,769, filed on Feb. 7, 2001, now Pat. No. 7,369,161.

(51) Int. Cl.
- *H04N 5/228* (2006.01)
- *H04N 5/76* (2006.01)
- *H04N 7/12* (2006.01)

(52) U.S. Cl. ............... 348/222.1; 348/231.99; 348/231.6; 375/240.19

(58) Field of Classification Search ............ None
See application file for complete search history.

(56) References Cited

U.S. PATENT DOCUMENTS

| | | | | |
|---|---|---|---|---|
| 5,790,878 A | * | 8/1998 | Anderson et al. | 713/340 |
| 6,020,920 A | * | 2/2000 | Anderson | 348/222.1 |
| 6,154,493 A | * | 11/2000 | Acharya et al. | 375/240.19 |
| 6,463,177 B1 | * | 10/2002 | Li et al. | 382/232 |
| 6,556,242 B1 | * | 4/2003 | Dunton et al. | 348/220.1 |
| 7,369,161 B2 | * | 5/2008 | Easwar et al. | 348/222.1 |

* cited by examiner

*Primary Examiner*—Luong T Nguyen
(74) *Attorney, Agent, or Firm*—Blakely, Sokoloff, Taylor & Zafman, LLP; Judith A. Szepesi

(57) ABSTRACT

An in-camera two-stage compression implementation is described that reduces the latency between snapshots to a fraction of that otherwise required by other systems that either process complete compression following each snapshot or that incorporate heavy, bulky, and expensive RAM hardware capable of maintaining several raw luminosity records (unprocessed file containing a digital image). In the 1st stage compression the raw luminosity record is quickly, yet partially, compressed to available RAM buffer space to allow a user to expeditiously capture a succeeding image. When the higher-priority processes, the user shooting pictures, and stage one compression subside, a 2nd stage compression, which is slower but more effective, decompresses the earlier partially-compressed images, and re-compresses them for saving in flash memory until they are distributed to a remote platform to be finally converted to the JPEG2000 format.

18 Claims, 21 Drawing Sheets

JPEG COMPRESSION (48:1)

WAVELET TRANSFORM COMPRESSION (48:1)

JPEG COMPRESSION (32:1)

WAVELET TRANSFORM COMPRESSION (32:1)

JPEG
COMPRESSION
(16:1)

WAVELET
TRANSFORM
COMPRESSION
(16:1)

DIGITAL CAMERA DEVICE PROVIDING IMPROVED METHODOLOGY FOR RAPIDLY TAKING SUCCESSIVE PICTURES

RELATED APPLICATIONS

The present application is related to, and claims the benefit of priority of, the following commonly-owned non-provisional application(s): application Ser. No. 09/489,511, filed Jan. 21, 2000, entitled "Improved Digital Camera Device with Methodology for Efficient Color Conversion", of which the present application is a Continuation-in-part application thereof. The disclosure of the foregoing application is hereby incorporated by reference in its entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to the field of digital cameras and digital image processing and, more particularly, to designs and techniques for reducing processing requirements and therefore size of digital cameras.

Today, digital imaging, particularly in the form of digital cameras, is a prevalent reality that affords a new way to capture photos using a solid-state image sensor instead of traditional film. A digital camera functions by recording incoming light on some sort of sensing mechanisms and then processes that information (basically, through analog-to-digital conversion) to create a memory image of the target picture. A digital camera's biggest advantage is that it creates images digitally thus making it easy to transfer images between all kinds of devices and applications. For instance, one can easily insert digital images into word processing documents, send them by e-mail to friends, or post them on a Web site where anyone in the world can see them. Additionally, one can use photo-editing software to manipulate digital images to improve or alter them. For example, one can crop them, remove red-eye, change colors or contrast, and even add and delete elements. Digital cameras also provide immediate access to one's images, thus avoiding the hassle and delay of film processing. All told, digital photography is becoming increasingly popular because of the flexibility it gives the user when he or she wants to use or distribute an image.

The defining difference between digital cameras and those of the film variety is the medium used to record the image. While a conventional camera uses film, digital cameras use an array of digital image sensors. When the shutter opens, rather than exposing film, the digital camera collects light on an image sensor, a solid state electronic device. The image sensor contains a grid of tiny photosites that convert light shining on them to electrical charges. The image sensor may be of the charged-coupled device (CCD) or complementary metal-oxide semiconductor (CMOS) varieties. Most digital cameras employ charge-coupled device (CCD) image sensors, but newer cameras are using image sensors of the complimentary metal-oxide semiconductor (CMOS) variety. Also referred to by the acronym CIS (for CMOS image sensors), this newer type of sensor is less expensive than its CCD counterpart and requires less power.

During camera operation, an image is focused through the camera lens so that it will fall on the image sensor. Depending on a given image, varying amounts of light hit each photosite, resulting in varying amounts of electrical charge at the photosites. These charges can then be measured and converted into digital information that indicates how much light hit each site which, in turn, can be used to recreate the image. When the exposure is completed, the sensor is much like a checkerboard, with different numbers of checkers (electrons) piled on each square (photosite). When the image is read off of the sensor, the stored electrons are converted to a series of analog charges which are then converted to digital values by an Analog-to-Digital (A-to-D) converter, which indicates how much light hit each site which, in turn, can be used to recreate the image.

Early on during the digital imaging process, the picture information is not in color as the image sensors basically only capture brightness. They can only record grayscale information—that is, a series of increasingly darker tones ranging from pure white to pure black. Thus, the digital camera must infer certain information about the picture in order to derive the color of the image. To infer color from this black and white or grayscale image, digital cameras use color filters to separate out the different color components of the light reflected by an object. Popular color filter combinations include, for instance, a red, green, and blue (RGB) filter set and a cyan, magenta, and yellow (CMYK) filter set. Filters can be placed over individual photosites so each can capture only one of the filtered colors. For an RGB implementation, for example, one-third of the photo is captured in red light, one-third in blue, and one-third in green. In such an implementation, each pixel on the image sensor has red, green, and blue filters intermingled across the photosites in patterns designed to yield sharper images and truer colors. The patterns vary from company to company but one of the most popular is the Bayer mosaic pattern, which uses a square for four cells that include two green on one diagonal, with one red and one blue on the opposite diagonal.

Because of the color filter pattern, only one color luminosity value is captured per sensor pixel. To create a full-color image, interpolation is used. This form of interpolation uses the colors of neighboring pixels to calculate the two colors a photosite did not record. By combining these two interpolated colors with the color measured by the site directly, the original color of every pixel is calculated. This step is compute-intensive since comparisons with as many as eight neighboring pixels is required to perform this process properly. It also results in increased data per image so files get larger.

In order to generate an image of quality that is roughly comparable to a conventional photograph, a substantial amount of information must be captured and processed. For example, a low-resolution 640×480 image has 307,200 pixels. If each pixel uses 24 bits (3 bytes) for true color, a single image takes up about a megabyte of storage space. As the resolution increases, so does the image's file size. At a resolution of 1024×768, each 24-bit picture takes up 2.5 megabytes. Because of the large size of this information, digital cameras usually do not store a picture in its raw digital format but, instead, apply compression technique to the image so that it can be stored in a standard-compressed image format, such as JPEG (Joint Photographic Experts Group). Compressing images allows the user to save more images on the camera's "digital film," such as flash memory (available in a variety of specific formats) or other facsimile of film. It also allows the user to download and display those images more quickly.

During compression, data that are duplicated, or which have no value, is eliminated or saved in a shorter form, greatly reducing a file's size. When the image is then edited or displayed, the compression process is reversed. In digital photography, two forms of compression are used: lossless and lossy. In lossless compression (also called reversible compression), reversing the compression process produces an image having a quality that matches the original source. Although lossless compression sounds ideal, it doesn't provide much compression. Generally, compressed files are still a third the size of the original file, not small enough to make much difference in most situations. For this reason, lossless compression is used mainly where detail is extremely important as in x-rays and satellite imagery. A leading lossless compression scheme is LZW (Lempel-Ziv-Welch). This is used in GIF and TIFF files and achieves compression ratios of 50 to 90%.

Although it is possible to compress images without losing some quality, it is not practical in many cases. Therefore, all popular digital cameras use a lossy compression. Although lossy compression does not uncompress images to the same quality as the original source, the image remains visually lossless and appears normal. In many situations, such as posting images on the Web, the image degradation is not obvious. The trick is to remove data that is not obvious to the viewer. For example, if large areas of the sky are the same shade of blue, only the value for one pixel needs to be saved along with the locations of where the other identical pixels appear in the image.

The leading lossy compression scheme is JPEG (Joint Photographic Experts Group) used in JFIF files (JPEG File Interchange Format). JPEG is a lossy compression algorithm that works by converting the spatial image representation into a frequency map. A Discrete Cosine Transform (DCT) separates the high- and low-frequency information present in the image. The high-frequency information is then selectively discarded, depending on the quality setting. The greater the compression, the greater the degree of information loss. The scheme allows the user to select the degree of compression, with compression ratios between 10:1 and 40:1 being common. Because lossy compression affects the image, most cameras allow the user to choose between different levels of compression. This allows the user to choose between lower compression and higher image quality, or greater compression and poorer image quality.

One would think with present-day digital technology and scale, one could create a digital camera that is extremely small and portable, particularly since a digital camera is not constrained by the physical constraints of traditional photographic film. This is not the case today, however. As it turns out, the whole process of capturing light and generating a color digital image, such as with a digital camera, is a very compute-intensive process. Further, the resulting images stored at digital cameras today are comparatively large (e.g., image size of one-half megabyte or more is common), thus making it unattractive to download images using wireless (e.g., cellular phone) transmission. The process of recording an image on photographic film, in comparison, relies on straightforward chemical reactions, all without the need for computing resources. A digital image, however, entails a process of converting light into electrical signals, converting those electrical signals into digital or binary information, arranging that information into a visual representation, applying various digital filters and/or transformations, interpolating color from that representation, and so forth and so on. The process of rendering a meaningful digital picture is a compute-intensive undertaking, roughly equivalent in processing power to that required today for a desktop workstation, yet done so within the confines of a handheld portable device.

The upshot of this substantial processing requirement is that, paradoxically, digital cameras today are relatively bulky devices since they require relatively large batteries to support their processing needs. This is easily seen today in camera designs. For instance, digital cameras by Sony employ large custom lithium batteries. Other camera designs employ four to six AA batteries—a fairly bulky arrangement. Even with all those batteries, digital cameras today have relatively short battery lives, such that the digital camera user is required to change out batteries at frequent intervals. Perhaps the biggest drawback of such an approach, however, is the added bulk imparted to the camera itself with such a design. Today, most of the weight of a digital camera is attributable to its batteries. Thus, present-day digital cameras, been constrained by their battery requirements, are generally no smaller or portable than their non-digital counterparts (e.g., standard 35 mm camera). And the smallest cameras today still remain film-based cameras, not digital ones, due in large part to the battery constraints of digital cameras.

Current approaches to reducing camera size have relied on improvements to the underlying silicon (e.g., microprocessor) technology. For example, one approach is that of increased integration, such as using custom chip sets that are specialized for digital cameras. Examples include, for instance, products offered by Sierra Imaging of Scotts Valley, Calif. and VLSI Vision Ltd. of Edinburgh, Scotland. The basic goal is to decrease a camera's energy requirements by super-integrating many of the digital camera's components onto a single chip, thereby realizing at least some energy savings by eliminating energy requirements for connecting external components. Another approach is to rely on ever-improving silicon technology. Over time, as silicon technology evolves (e.g., with higher transistor densities), ever-increasing compute power is available for a given energy ratio. Either approach does not address the underlying problem that a compute-intensive process is occurring at the digital camera, however. Moreover, the approaches do not address the problem that large image sizes pose to wireless transmission. As a result, the improvement afforded by increased integration or improvements in transistor density provide incremental improvement to camera size, with little or no improvement in the area of wireless transmission or downloading of images.

Moreover, as silicon technology improves, a competing interest comes into play. The marketplace is demanding better image quality and better image resolution. To the extent that improved silicon technology becomes available, that technology by and large is being applied to improving the output of digital cameras, not to decreasing their power requirements (and thereby their size). The net result is that improvements to silicon technology have resulted in better resolution but little or no change in camera size.

Another approach is to focus on improving the underlying image compression methodology itself, apart from the other aspects of image processing. For instance, one could envision a better compression technique that reduces computational requirements by reducing the amount of image data (e.g., using "lossy" compression methodology) substantially more than is presently done. Unfortunately, efforts to date have resulted in images of relatively poor quality, thus negating improvements to resolution afforded by improved silicon technology. Although future improvements will undoubtedly be made, such improvements are—like those to silicon technology—likely to be incremental.

Given the substantial potential that digital imaging holds, there remains great interest in finding an approach today for substantially decreasing the size of digital cameras and improving the downloading of images, particularly in a wireless manner, but doing so in a manner that does not impair image quality. In particular, what is needed is a digital camera that allows users to enjoy the benefits of digital imaging but without the disadvantages of present-day bulky designs with their lengthy image download transmission times. The present invention fulfills this and other needs.

The current technology of digital cameras limits the user's ability to quickly take several pictures. This is because the post-snapshot compression of each picture requires more time than may be desired. As previously described, the camera's compression of the luminosity record of the captured image is a computationally-expensive process. If the compression process immediately follows the image capture and is completed in a single-tasking environment, it would tie-up the resources of the camera, resulting in an unacceptably long delay before the user could take another picture. On the other hand, if the compression processing were postponed while the user continued to take a quick series of pictures, both the RAM and flash memory capacities of the camera would be exhausted.

Alternative attempts to address this problem basically involved adding hardware and/or more implementation-specific algorithms. These attempts require more utilization of battery energy and processor resources, and therefore add weight, size, and cost to the camera device. Accordingly, a better solution is desired.

SUMMARY OF THE INVENTION

A two-staged image compression methodology of the present invention implements a digital camera that allows users to take successive snapshots rapidly. The underlying strategy of the present invention assumes that the user will not take more than a few pictures (e.g., 3-6 pictures) in rapid succession. The first stage employs a relatively simple compression technique that is selected for its fast operation (i.e., requires fewer processing resources), although it may not necessarily be as efficient in minimizing the file size. The first stage partially compresses the image quickly, and temporarily saves this record either in RAM or in flash memory. This approach immediately frees up both memory and processor resources of the camera, thereby facilitating the user's ability to continue shooting pictures without waiting for full compression processing of the current picture. The second stage of the on-camera compression, which employs more thorough compression, is deferred as a background process for when the user is no longer using the camera to take successive photographs.

The present invention utilizes a multi-threading environment in which the user's taking a picture has the highest priority (assuming there is enough remaining space in the RAM buffer for another raw, uncompressed, luminosity record), the first stage compression process has the next highest priority, and the second stage compression process has the lowest priority. In this approach certain buffer memory is set aside for the raw snapshots and some for the stage 1 compressed snapshots. For example, the device could assign a full raw image sized memory buffer for the raw picture capture and three buffers for the stage 1 buffers. In this case, if the user were attempting to take several pictures back-to-back as fast as the camera would allow him, then he would experience: no delay with the first picture, a delay equivalent to capturing the first picture to a raw image buffer for the second picture (say 0.5 seconds), and a delay equivalent to raw picture capture time, combined with Stage 1 processing time (3+0.5=3.5 seconds) for the next 3 pictures, and a delay equivalent to raw picture capture time plus stage 1 plus stage 2 processing time (0.5+3+13=16.5 seconds) for subsequent pictures. The relatively quick and processing-inexpensive stage 1 compression results in an approximate file size compression ratio of 1:4; the deferred stage 2 compression, which decompresses and then fully compresses the image, results in an approximate file size compression ratio of 1:20.

There is a sequence of four processes for the photo acquisition and on-device storage for every snapshot event: the image is captured by the image sensors when the camera shutter is open, the pre-compression fine tunes the fidelity of the image and converts it to a YUV or GUV representation, the stage 1 compression quickly, yet partially, compresses it if there is space in the RAM buffer for this, and then, during an inactive time period, the stage 2 compression both decompresses and fully re-compresses the image for persistent storage in flash memory.

The pre-compression stage implements the standard pre-processing for capturing digital photographs: auto-exposure, auto-focus, auto-white balance, noise smoothing, demosaic, RGB color space conversion to YUV or GUV, sharpening the Y-plane (if YUV), smoothing the U and V planes, and sub-sampling the U and V planes.

The stage 1 compression implements a Discrete Wavelet Transformation (DWT), which minimizes "pixelization" artifacts, to optimize the data for compression. Each color plane in each band is individually transformed by DWT, rendering it ready for an initial (small-step) quantization. The DWT decomposes the image into the LL band, LH band, HL band, and HH band Each band is quantized (i.e., divided) by possibly a different quantization step size. Next, each bit plane is low-complexity entropy encoded, which is a fast encoding process. The working embodiment of this invention uses a run-length encoding (RLE) technique. As another implementation of low-complexity entropy encoding, one could use Huffman coding, which would result in JPEG-like speeds.

The stage 2 compression decompresses the image that was compressed in the 1st stage compression, and then re-compresses the image to a smaller size (1/20th instead of 1/4th). Stage 2 compression occurs at a convenient deferred time when the user is not actively deploying the camera and all stage 1 compression processing has completed. Each bit plane in a band is decoded and its bitstream pared. Then the bit planes are encoded using arithmetic coding. The stage 2 compression task does not consume considerable RAM buffer space, because it is done piecemeal: sequentially, each (stage 1 compressed) bit plane within a band is decompressed and re-compressed before the next consecutive bit plane is processed.

The encoded picture is transmitted wirelessly to a server, where it is transcoded to JPEG2000. Transcoding for JPEG2000 involves decoding the bit planes and re-encoding them with the JPEG2000-specific bit plane coding method. This method codes each bit plane in 3 passes. Further, it does not employ the run-length encoding scheme that is used to pare down the number of bits coded. Together, these two factors contribute to much lower performance. However, since the JPEG2000 process runs on powerful backend servers, this loss of performance is not perceived by the user. Furthermore, the user gets the picture in an industry-standard format, that can be manipulated by other systems, for display, or the like.

The overall methodology employed may be summarized as follows. The process begins with receipt of user input requesting capture of a sequence of digital images at the digital camera; these digital images are stored in an image buffer (e.g., RAM). The method applies a relatively-fast compression technique (i.e., stage 1 compression) to temporarily compress at least some of the digital images upon capture, so as to increase availability of storage in said image buffer for storing other digital images being captured. At some point in time after cessation of the user input, the method may then proceed to decompress any of the digital images that were temporarily compressed. Thereafter, the method may then apply a relatively-thorough compression technique to the captured sequence of digital images.

This methodology may be embodied within a digital camera device providing improved latency time between acquiring pictures. The digital camera device includes an image buffer for capturing digital images (i.e., snapshots). The digital camera also includes a shutter button or other user-activated button, integrated into the digital camera device, for generating a user request to capture a sequence of digital images. Upon capture, these digital images are stored in the image buffer. Stage 1 compression is embodied within the device as a first compression module, for temporarily compressing at least some of the digital images upon capture, thereby freeing up available storage in the image buffer. In conjunction with this first compression module, the device includes a decompression module capable of reversing the stage 1 compression (or at least returning the images to their approximate original state). More particularly, the decompression module operates for decompressing any of the digital images that were temporarily compressed at some point in time after activation of said user-activated button. For more-thorough compression, the device also includes a second compression module for applying stage 2 compression, thereby compressing the digital images more thoroughly than that provided by the first compression module. Images that have been compressed with stage 2 compression are suitable for non-temporary storage to a persistent media (e.g., flash memory), and/or for transfer (especially, wireless transfer) to a remote device for further processing (e.g., transferred to a server computer for transformation into a JPEG or JPEG 2000 image file for online sharing).

GLOSSARY

Figure 1A:
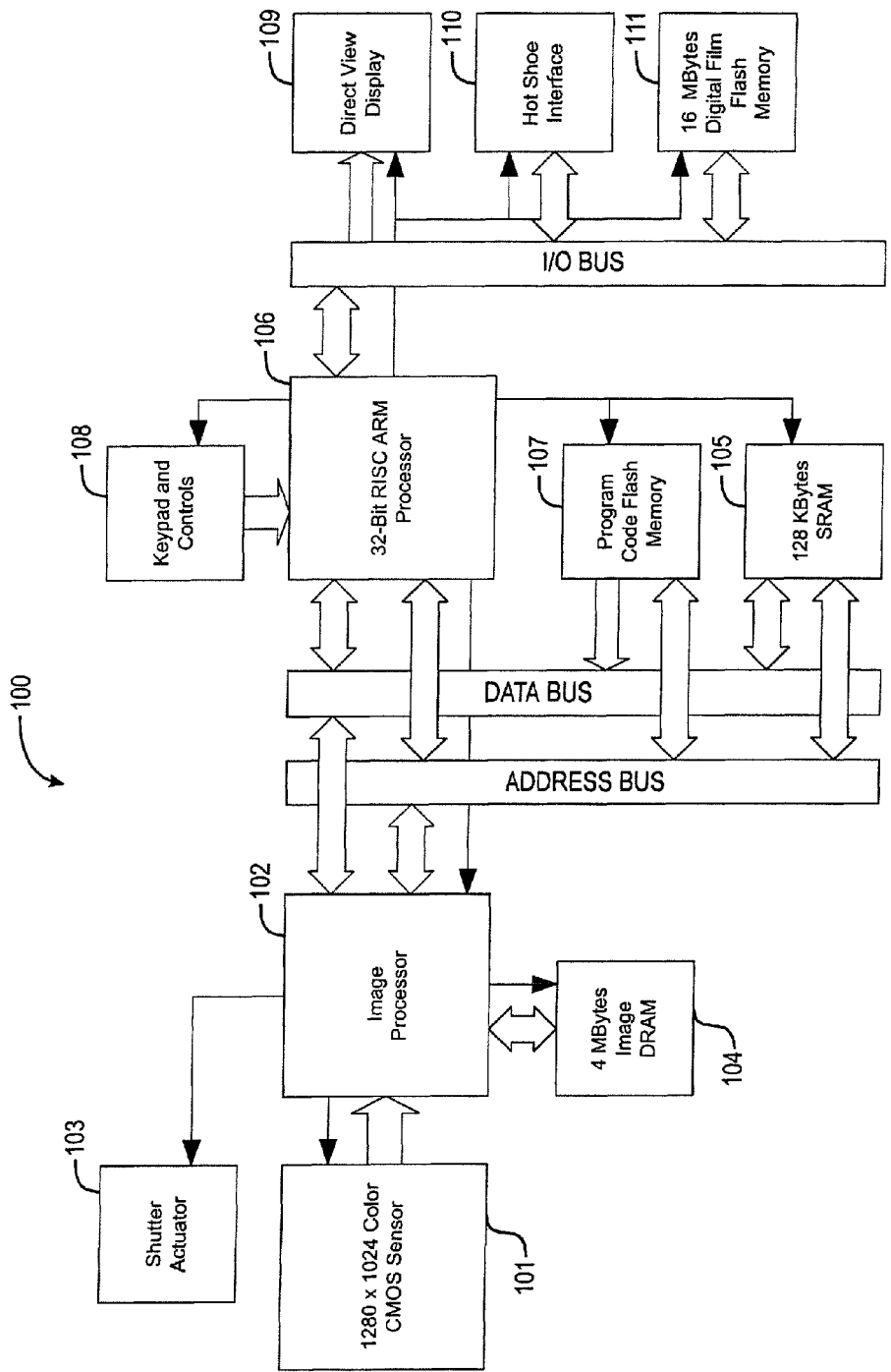
FIG. 1A is a block diagram illustrating a digital camera device suitable for implementing the present invention.

Color space: This is typically a three-dimensional space that represents the color of image pixels. Image pixels are typically represented by the three triplet colors: red (R), green (G), and blue (B). R, G, and B can vary between 0.0 (minimum) and 1.0 (maximum). In addition to the RGB color space, other color spaces, like CMY (Cyan, Magenta, Yellow), HSV (Hue, Saturation, Value), and YUV (Luminance, Chrominance U, and Chrominance V), are also used in the literature. Typically these color spaces are related by matrix transformations.

Cell: Image sensors are overlaid with a color filter array that has a fixed repeating pattern. The pattern is typically 2 pixels wide and 2 pixels high, and has 2 green filters and 1 red and 1 blue filter. This repeating pattern is called a "cell". The above pattern is a particular example that is often referred to as a "Bayer" pattern.

Companding: Companding is the process of mapping the luminosity values captured by the image sensor into a space that is more linear to the human eye. Typically, quantization (reduction in bit-depth) is associated with companding. For example, 10-bit sensor values are non-linearly mapped and reduced in bit-depth to 8-bits. Different mappings may be employed for the R, G, and B planes. As a computer-implemented process (e.g., software or firmware implemented), this mapping is typically performed through a look-up table that maps 10-bit sensor values to 8-bit values.

Mosaic: A mosaic is the image generated by an image sensor overlaid with a color filter array.

Transform-based compression: Transform-based compression involves subjecting each color plane of an image by a mathematical transform (e.g., such as the Fourier Transform, Cosine Transform, or Wavelet Transform). The transformed plane is more amenable to image compression. The transformed plane is quantized (i.e., fewer bits are retained per pixel than in the original) and compressed using entropy coding techniques, like Huffman or arithmetic coding.

Channel: Channels are the axes of a color space. For example the R, G, B color space has Red, Green, and Blue channels.

Primary and secondary channels: The primary channel is the color space axis that is most important for human perception.

The secondary channels are the remaining two channels. For example, in the YUV color space, the Y channel is the primary channel and U and V are secondary channels. In the RGB color space, G is the primary channel and R and B are secondary channels.

DETAILED DESCRIPTION OF A PREFERRED EMBODIMENT

The following description focuses on an embodiment of the present invention in a digital camera device, which is the currently-preferred embodiment. However, those skilled in the art will appreciate that the present invention may be embodied in other image capturing/recording/processing devices, including, for instance, video phones, closed-circuit cameras, video camcorders, or other devices capable of capturing, recording, and/or processing images. Further, the description will focus on implementation of portions of the invention in an Internet-connected environment including a desktop and server computer, such as an IBM-compatible computer running under Microsoft® Windows 2000. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like. Therefore, the description of the exemplary embodiments which follows is for purposes of illustration and not limitation.

Basic System

A. Digital Camera Hardware

FIG. 1A is a block diagram illustrating a basic image capturing and recording system 100 suitable for implementing the present invention. For purposes of illustration, the following will focus on implementation of system 100 as a digital camera. However, as noted above, for purposes of implementing the methodology of the present invention, the system 100 may also be implemented in a variety of other digital image devices.

As shown in FIG. 1A, the system 100 includes a Sensor 101, a Shutter Actuator 103, an Image Processor 102, an Image (DRAM) Memory 104, a (Central) Processor 106, a Keypad and Controls 108, a Program Code Flash Memory 107, a (System) Memory 105, a Direct View Display or Viewfinder 109, a Hot Shoe Interface 110, and a "Digital Film" Flash Memory 111. As illustrated, these various components communicate with one another using a bus architecture including, for instance, an Address Bus, a Data Bus, and an I/O (Input/Output) Bus.

The system 100 employs the Sensor 101 for basic image capture. The Sensor 101 operates, in essence, by capturing light and transforming that into electrical voltage levels. A suitable sensor is available from a variety of vendors, including VLSI Vision, Motorola, and Toshiba. In a preferred embodiment, the Sensor 101 includes, for example, a 1280× 1024 color CMOS sensor, such as a VLSI Vision VVL 6801 CMOS sensor. However, other sensor technology is suitable, including CCD sensors.

The Sensor 101 must, of course, be part of a larger assembly to operate. Specifically, the Sensor 101 operates in conjunction with a lens assembly (not shown), or other optics to focus an image onto the sensor. The optics themselves are controllable, for instance, using a conventional aperture, focus, and shutter control mechanisms. The currently-preferred embodiment uses an 18 mm fixed-focal length, fixed-aperture lens assembly to provide a broad depth of field. The lens assembly employs two manual slide controls, a macro lens control, and an exposure control. The macro control switches from normal to close mode by sliding a macro lens in and out of the lens assembly to provide normal or extreme close-up capability. The exposure control switches from normal to bright light by sliding a neutral gray filter in and out of the lens assembly. Aside from choosing normal or bright light, normal or close-up mode, the camera requires no manual focusing, shutter speed, or aperture adjustment. Operation is as simple as point and shoot. The Sensor 101, on the other hand, operates under control of the Image Processor 102, which will now be described.

The Image Processor 102, which basically operates as a state machine, provides overall control for the Sensor 101. In operation, the Image Processor 102 controls the Sensor 101 by, in effect, telling it what to do and when. For instance, the Image Processor 102 issues timing signals to the Sensor 101 for indicating how the Sensor 101 should record and stream out image data. Further, the Image Processor 102 provides general Input/Output (I/O) control that allows one to coordinate control of the sensor with other electromechanical peripherals, such as a shutter, lens aperture, or the like.

Actual implementation of the Image Processor 102 itself may be accomplished in a variety of different ways. For a microprocessor-based implementation, for instance, the Image Processor 102 may be implemented as a microprocessor (e.g., PowerPC 823 microprocessor, available from Motorola, Inc. of Schaumburg, Ill.) with DSP (digital signal processing) logic blocks, memory control logic blocks, video control logic blocks, and interface logic. Alternatively, the Image Processor 102 may be implemented as a "camera on a chip(set)" using, for instance, a Sierra Imaging Raptor I or II chipset (available from Sierra Imaging, Inc. of Scotts Valley, Calif.), a Sound Vision Clarity 1 or 2 chipset (available from Sound Vision, Inc. of Framingham, Mass.) or similar chipset that integrates a processing core with image processing periphery. In a preferred embodiment, the Image Processor 102 preferably supports hardware implementation of a wavelet transform engine complete with a wavelet transform filter bank, so that the wavelet transform process may be pipelined through a series of dedicated hardware gates (instead of executed as a sequence of software instructions repeatedly loaded and processed by a general-purpose microprocessor). The Image Processor 102 is not a stand-alone part but, instead, relies on the (Central) Processor 106 for control instructions. The Image Processor 102 sits on the Address and Data Buses and is accessible by the Processor 106 through a series of registers. In this manner, the Processor 106 may instruct the Image Processor 102 what to perform and when. For instance, the Processor 106 may instruct the Image Processor 102 to turn on the Sensor 101, to capture an image at the Sensor 101, and to execute the wavelet transform. Therefore, the Image Processor 102 is very much a facilitator but is not in and of itself a controller for the system.

The Shutter Actuator 103 is a simple, generic component for controlling light exposure on the Sensor 101. Depending on the behavior of the actual sensor employed, the Shutter Actuator 103 may not even be necessary. In particular, the Shutter Actuator 103 is employed in those instances where the Sensor 101 requires a black reference. In such an embodiment, the Shutter Actuator 103 is an electromechanical interface coupled to a solenoid which, when the interface responds to a particular logic level, triggers an open/close cycle of a mechanical shutter. The mechanical shutter, which serves to selectively block light entering the lens assembly of the camera, may be of a conventional design available from a variety of suppliers. A suitable supplier includes, for instance, Sunex, Inc. of Carlsbad, Calif.

The Image Memory (DRAM) 104 serves to store the image captured from the sensor. The Sensor 101 itself does not "store" the image that it captures. Therefore, the Image Memory 104 is an image capture and in-place transform (frame) buffer. This memory is controlled by the Image Processor 102 and can be shut off when not in use for power-saving purposes. During basic operation of the camera, the captured image is transferred directly into the Image Memory 104, using a sample/transfer technique. In order to make this efficient, the process is controlled by the Image Processor 102 in a manner somewhat akin to DMA (direct memory access) transfer employed on desktop computers. Here, the Image Processor 102 functions as a state machine which simply samples and transfers information from the Sensor 101 to the Image Memory 104. In the presently-preferred embodiment, the Image Memory 104 comprises conventional DRAM (dynamic random-access memory) memory available from a variety of vendors, including, for instance, Toshiba, Micron, Hitachi, Samsung, and others. A size of about 4 MB (megabyte) or more is suitable for this component.

The next several components discussed, which may be viewed as components hanging off of the Address and Data Buses of the Processor 106, are typical components that one would ordinarily expect to find when implementing a data processing device; collectively, these components may be viewed as a computer embedded in the camera. For example, these components include the previously-mentioned general-purpose microprocessor (Processor 106) coupled to memory (System Memory 105 and Program Code Flash Memory 107). The Working or System Memory 105 is the general working or scratchpad memory for the Processor 106. This memory is used for storing program-created variables, stacks, heap(s), and the like. In the presently-preferred embodiment, the System Memory 105 comprises static RAM (e.g., SRAM), which is also available from a variety of vendors. A size of about 128 KB (kilobyte) or more is suitable for this purpose. The Program Code Flash Memory 107, on the other hand, comprises 1 MB of directly-addressable flash storage that holds the operating system and embedded software, that is, the program code comprising the instructions that the processor must execute to operate. The flash memory, which may be conventional flash memory that is available from a variety of vendors, need not be of the removable type, as the Program Code Flash Memory 107 is not intended to be removed from the system by the camera user.

The Processor 106 itself, in the presently-preferred embodiment, comprises a 32-bit RISC ARM Processor designed by ARM Limited of Maidenhead, UK. ARM licenses its designs to semiconductor partners for manufacture, supply, and support; for a list of ARM licensees, see e.g., http://www.arm.com/Partners/. The ARM processor has an efficient instruction set that is ideal for performing cyclical functions quite rapidly and includes sufficient bandwidth for transferring large amounts of data quickly (e.g., for performing Huffman coding on a large amount of data). Additionally, the processor is a dedicated processor, without the overhead of a substantial number of peripherals. These features make the processor attractive for use in a digital camera embodiment.

For a camera embodiment, the device will, in general, be expected to include an interface that is capable of receiving input from users. Keypad and Controls 108 are conventional inputs that support user input. Similarly, the Direct View Display ("Viewfinder") 109 is a direct view LCD (liquid crystal display) that provides feedback to the user or camera operator. During photography mode, the Viewfinder 109 replaces the plastic viewfinders and LCD panels found on most digital cameras and provides the most accurate real-time representation of the scene visualized by the sensor. The Viewfinder 109 overlays simple icons onto the image to indicate the status of various camera settings. The Viewfinder 109 fits inside an eyepiece which keeps sunlight out and allows the operator to visualize the scene in any lighting conditions. During preview mode, the Viewfinder 109 shows previews of the captured photos and allows the operator to delete unwanted photos or tag photos for wireless transmission. Thus for a camera embodiment, the Viewfinder 109 is used to provide a representation of the image that is being captured, in preview and/or post-capture fashion.

In order to provide the display image to the Viewfinder 109, the Sensor 101 is subsampled at a rate to create a version of the image appropriate for display. During preview processing, the system continuously captures the sensor mosaic and sub-samples the resulting mosaic for preview purposes. A histogram of the sampled luminosity is fed into a "linearization" filter to produce a balanced dynamic range for best optical perception. The scaled and "linearized" image is then displayed on the viewfinder module. The histogram data is then adjusted to match the preview image for use in linearizing the next image. The cycle is repeated continuously to provide a real-time viewfinder mechanism. The Viewfinder 109 itself typically operates in conjunction with a display controller and a frame buffer (not shown), both of which may be integrated within the display component itself.

Both the Keypad and Controls and Display components, which may be conventional in nature, interface directly with the Processor 106 through general I/O (e.g., I/O Bus). Typically, such devices communicate with the microprocessor through means of interrupt requests (IRQ). Both the Keypad and Controls and Display components are available from a variety of vendors. Examples include Sharp, Toshiba, and Citizen of Japan, Samsung of South Korea, and Hewlett-Packard of Palo Alto, Calif. More customized displays are available from Displaytech, Inc. of Longmont, Colo. For an embodiment that does not need to interact with users, such as a surveillance camera, the foregoing components may be eliminated.

Additionally for a camera embodiment, it is desirable for the device to include an interface for standard peripheral devices, such as a detachable flash device. This may be provided by Hot Shoe (Accessory) Interface 110, which is a general I/O port that may comprise a serial interface of a conventional design that the camera uses to interface to its accessories via the Hot Shoe Interface. In this manner, a flash accessory can be clipped onto the camera via the Hot Shoe Interface for added illumination.

The Interface 110 combines a Serial Peripheral Interface (SPI) with a multiplexed I/O bus which provides a plug-and-play interface to a family of accessories. These accessories may include, in addition to a flash unit, a wireless holster for cellular (e.g., Motorola) phones, extra film backs for compatibility with format digital film (e.g., Sony Memory Stick or SmartMedia), a USB cradle, an RJ-11 modem cradle, a wireless cellular module, extender cables, and the like. In the currently-preferred embodiment, the interface is based on the $I^2C$-standard serial interface, which supports logic allowing the device to sense $I^2C$-compatible devices that are attached to the port. $I^2C$, which stands for Inter IC Communication, is a serial bi-directional communication protocol created by Philips Semiconductor (subsidiary of Philips Electronics, based in The Netherlands) and is used for communication between integrated circuits. Most systems have one master and several slaves that communicate using only two wires. Every device has its own identification code. If that code is sent by the master only that device will respond with an acknowledgement. After the acknowledgement, the data to be communicated is sent or received by the master. Further information about the I²C communication protocol is available from Philips Electronics of The Netherlands. As with the Keypad and Controls 108 and Direct View Display or Viewfinder 109, the Hot Shoe Interface 110 itself is not required for implementing the image capturing and processing methodology of the present invention. In the specific embodiment of a consumer product such as a camera, though, these components typically would be included.

The system includes Digital Film Flash Memory 111, which serves as the "digital film" for the system for storing compressed images. The Flash Memory 111 may comprise available flash memory removable media, such as Compact-Flash, DataFlash, and Sony Memory Stick, typically in a 16 MB or larger size. Available vendors for flash memory include, for example, SanDisk of Sunnyvale, Calif. or Sony of Japan. Alternatively, the Flash Memory 111 may be affixed directly (i.e., non-removable) to the system 100. In such an embodiment, the additional bulk associated with a removable media cartridge holder and its accompanying interface may be avoided. Those skilled in the art will appreciate that the system 100 may incorporate other non-volatile memory configurations and designs that readily accommodate the image capture and processing methodology of the present invention. In general, for a consumer device embodiment, one should choose media that accommodates on the order of 100 compressed images or more.

The camera embodiment is powered by a single CR-123 lithium battery (not shown), provided with instant-on capability. Due in part to the distributed image processing approach of the present invention (presented below), the camera has significant power savings over other camera designs. This gives the device not only a size and weight advantage over other cameras but also a battery life advantage.

For connectivity, the system includes a wireless holster, a USB cradle, and a modem cradle. The wireless holster physically connects the camera to a cellular phone (e.g., Motorola cellular phone) and interfaces the Hot Shoe Interface to the phone's external accessory plug. The camera can be easily pulled out of the holster for use and clipped back in for transmission. Detection of the holster and phone signal is automatic to allow for hands free transmission and there is no risk of corruption due to interruption by either loss of signal or unclipping. The camera clips into the USB cradle through the Accessory Hot-Shoe to provide rapid photo interchange to a personal computer equipped with a standard USB port. The USB cradle acts a USB slave device and therefore requires no batteries or power supply for operation and instead draws its power from the PC. The camera can also clip into a modem cradle through the Hot Shoe Interface. The modem cradle allows the camera to transmit images to the PhotoServer via a land line connection (e.g., 33.6 KBps) via a standard RJ-11 phone jack. The modem cradle is powered by the battery in the camera.

The specifications for the currently-preferred camera embodiment may be summarized as follows.

TABLE 1

Miniature Wireless Digital Camera Specifications:

| | |
|---|---|
| Sensor: | 1.3 Mega-Pixel Color CMOS |
| Optics: | 18 mm Fixed Focal Length, Fixed Aperture |
| Exposure Control: | Automatic, Macro Mode, Indoor/Outdoor Mode |
| Processor: | ARM 32-bit RISC |
| Chipset: | Image Processor (Lightsurf PhotonOne) |
| Memory: | 4 Mbytes DRAM + 128 Kbytes SRAM |
| Digital Film: | 16 Mbytes Internal Flash Film |
| File Format: | Progressive Photograph Format (PPF) |
| Wireless Protocol: | communication protocol, such as packet-based TCP/IP, WAP, or the like |
| Battery: | CR-123 |
| Accessory Interface: | Accessory Hot-Shoe |
| Accessores: | Flash Unit, Extra Film Back, Motorola Cellular Holster, USB Cradle, Modem Cradle |

B. Basic Computer Hardware (e.g., for Desktop and Server Computers)

Figure 1B:
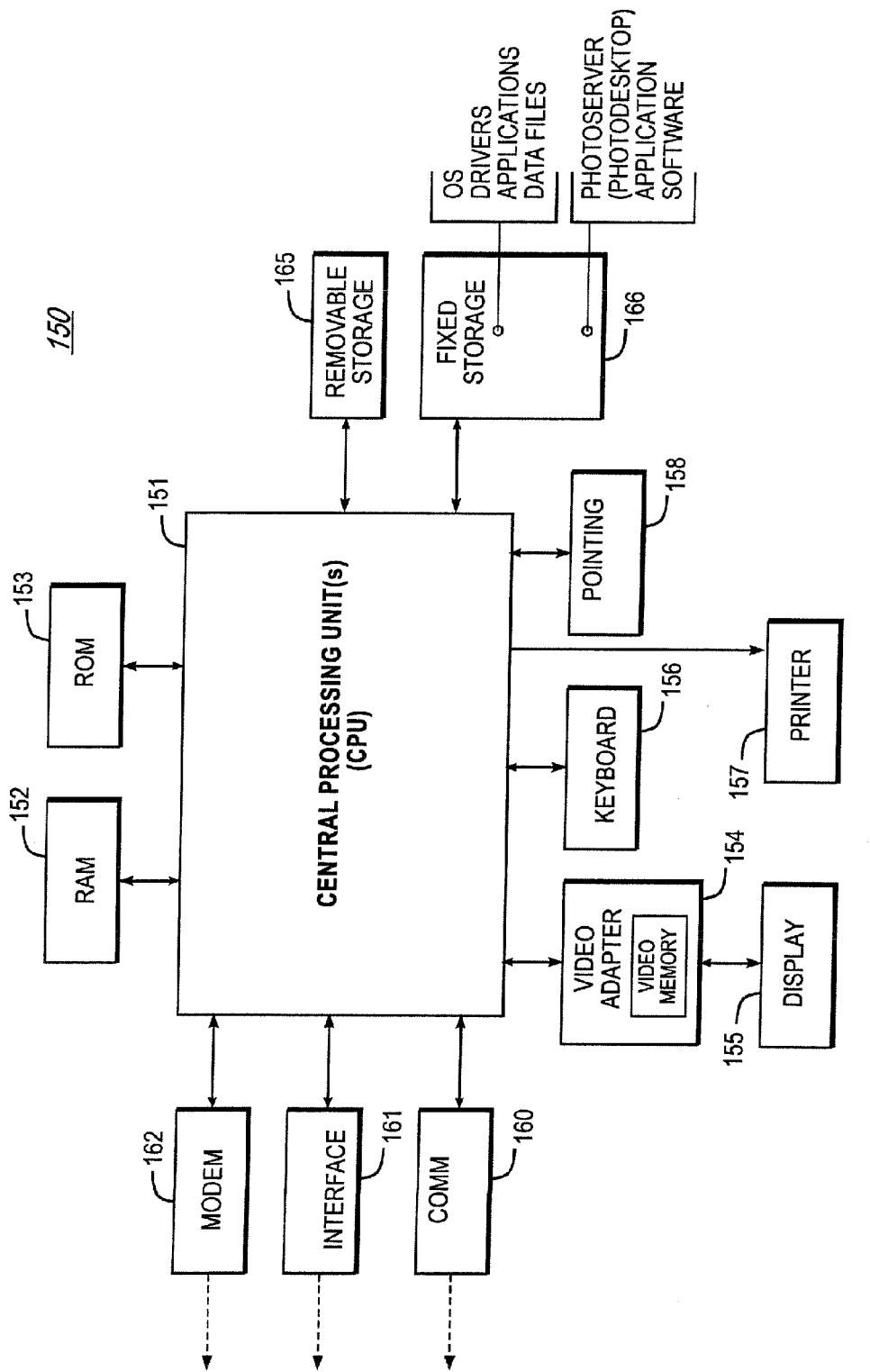
FIG. 1B is a block diagram illustrating a digital computer suitable for implementing distributed processing portions of the present invention.

Portions of the present invention may be implemented on a conventional or general-purpose computer system, such as an IBM-compatible personal computer (PC) or server computer. FIG. 1B is a very general block diagram of an IBM-compatible system 150, which is adapted to include portions of the distributed image processing of the present invention. As shown, system 150 comprises a central processor unit(s) (CPU) 151 coupled to a random-access memory (RAM) 152, a read-only memory (ROM) 153, a keyboard 156, a pointing device 158, a display or video adaptor 154 connected to a display device 155, a removable (mass) storage device 165 (e.g., floppy disk), a fixed (mass) storage device 166 (e.g., hard disk), a communication port(s) or interface(s) 160, a modem 162, and a network interface card (NIC) or controller 161 (e.g., Ethernet). Although not shown separately, a real-time system clock is included with the system 150, in a conventional manner.

CPU 151 comprises a processor of the Intel Pentium® family of microprocessors. However, any other suitable microprocessor or microcomputer may be utilized for implementing the present invention. The CPU 151 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 152 serves as the working memory for the CPU 151. In a typical configuration, RAM of sixteen megabytes or more is employed. More or less memory may be used without departing from the scope of the present invention. The read-only memory (ROM) 153 contains the basic input/output system code (BIOS)—a set of low-level routines in the ROM that application programs and the operating systems can use to interact with the hardware, including reading characters from the keyboard, outputting characters to printers, and so forth.

Mass storage devices 165, 166 provide persistent storage on fixed and removable media, such as magnetic, optical or magnetic-optical storage systems, or flash memory, or any other available mass storage technology. The mass storage may be shared on a network or it may be a dedicated mass storage. As shown in FIG. 1B, fixed storage 166 stores a body of program and data for directing operation of the computer system, including an operating system, user application programs, driver and other support files, as well as other data files of all sorts. Typically, the fixed storage 166 serves as the main hard disk for the system and stores application software implementing the PhotoServer (PhotoDesktop) component described below.

In basic operation, program logic (including that which implements methodology of the present invention described below) is loaded from the storage device or mass storage 166 into the main (RAM) memory 152, for execution by the CPU 151. During operation of the program logic, the system 150 accepts user input from a keyboard 156 and pointing device 158, as well as speech-based input from a voice recognition system (not shown). The keyboard 156 permits selection of application programs, entry of keyboard-based input or data, and selection and manipulation of individual data objects displayed on the display device 155. Likewise, the pointing device 158, such as a mouse, track ball, pen device, or the like, permits selection and manipulation of objects on the display device 155. In this manner, these input devices support manual user input for any process running on the system.

The computer system 150 displays text and/or graphic images and other data on the display device 155. Display device 155 is driven by the video adapter 154, which is interposed between the display device 155 and the system 150. The video adapter 154, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 150, may be obtained from the printer 157, or other output device. Printer 157 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 161 connected to a network (e.g., Ethernet network), and/or modem 162 (e.g., 56K baud, ISDN, DSL, or cable modem), examples of which are available from 3Com of Santa Clara, Calif. The system 150 may also communicate with local occasionally-connected devices (e.g., serial cable-linked devices) via the communication ("comm") interface 160, which may include an RS-232 serial port, a Universal Serial Bus (USB) interface, or the like. Devices that will be commonly-connected locally to the interface 160 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

The above-described system 150 is presented for purposes of illustrating the basic hardware underlying desktop and server computer components that may be employed in the system of the present invention. For purposes of discussion, the following description will present examples in which it will be assumed that there exists a "server" or remote device having information of interest to the ultimate end-user. The present invention, however, is not limited to any particular environment or device configuration. In particular, a server distinction is neither necessary to the invention, but is used to provide a framework for discussion. Instead, the present invention may be implemented in any type of computer system or processing environment capable of supporting the methodologies of the present invention presented in detail below.

C. Basic System Software

Figure 2:
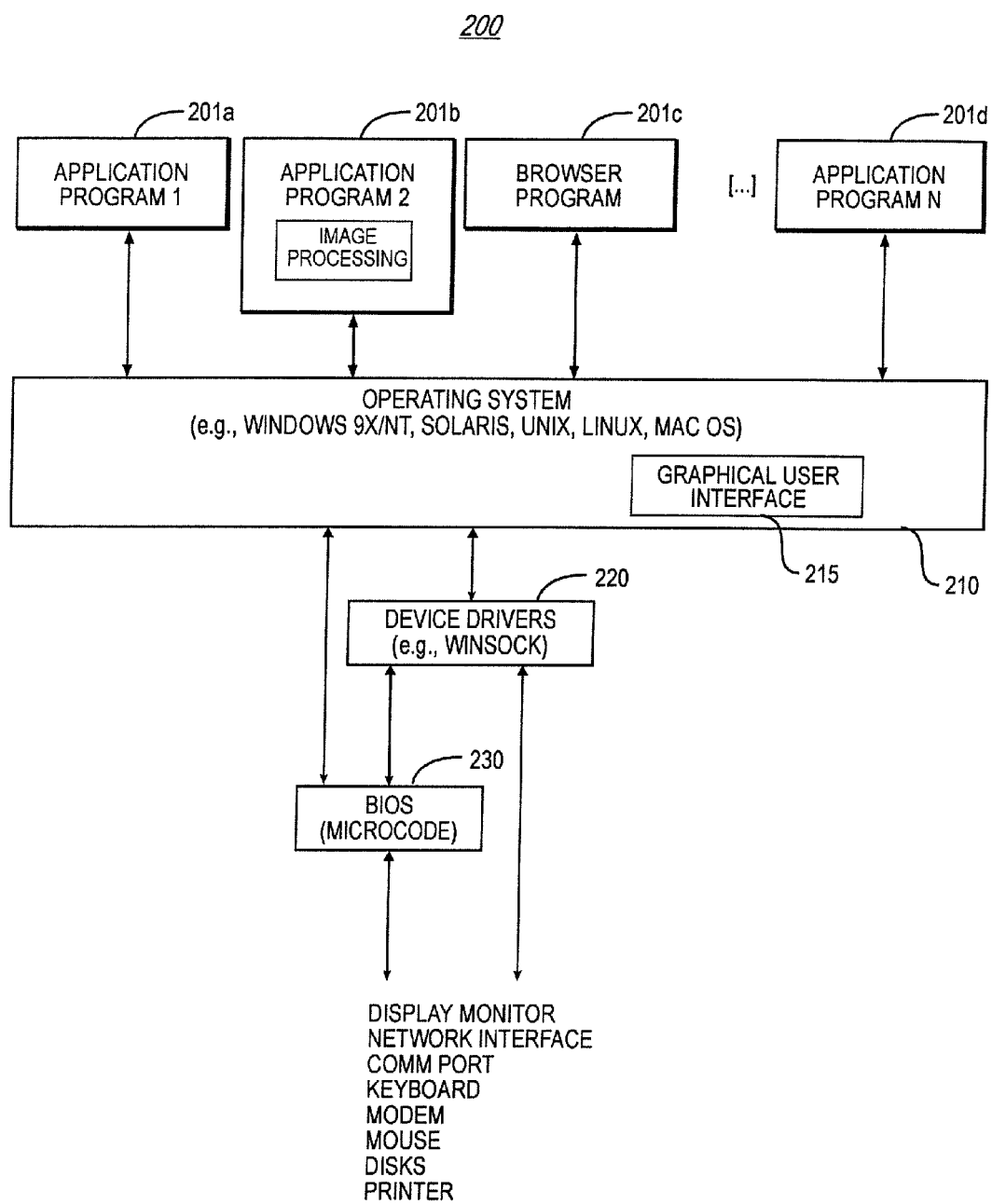
FIG. 2 is a block diagram of a software system suitable for controlling the computer of FIG. 1B.

Illustrated in FIG. 2, a computer software system 200 is provided for directing the operation of the computer system 150. Software system 200, which is stored in system memory 152 and on fixed storage (e.g., hard disk) 166, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d), including image processing software, may be "loaded" (i.e., transferred from fixed storage 166 into memory 152) for execution by the system 150.

Software system 200 includes a graphical user interface (GUI) 215, for receiving user commands and data in a graphical (e.g., "point-and-click") fashion. These inputs, in turn, may be acted upon by the system 150 in accordance with instructions from operating system 210 and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. OS 210 can be provided by a conventional operating system, such as Microsoft® Windows 9x, Microsoft® Windows NT, or Microsoft® Windows 2000, all available from Microsoft Corporation of Redmond, Wash. Alternatively, OS 210 can also be an alternative operating system, such as IBM OS/2 (available from IBM of Armonk, N.Y.) or Macintosh OS (available from Apple Computers of Cupertino, Calif.).

Distributed Digital Image Processing

A. Basic Design Consideration

The basic approach adopted by the present invention is to adopt techniques for reducing the amount of processing power required by a given digital camera device and for reducing the bandwidth required for transmitting image information to a target platform. Every digital imaging device is inherently connected. Consider, for instance, a digital camera. It does not necessarily appear to be a "connected" device, as it may initially give the appearance of an end-to-end solution, where one is capturing an image, processing that image, and then storing it on digital film. In reality, however, the true end product is some type of output, such as a printed image used in a document. As it turns out, somewhere along the way the image is taken off the device and transmitted to yet another computing device, such as a server or desktop computer, where, for instance, the image may be cropped, touched up, or otherwise processed. Therefore, a digital image—due to the fact that it is digital, is inherently related to all other types of computing devices that can handle images. Given that environment in which digital cameras exist, there is an opportunity to take advantage of other processing power that is eventually going to come into contact with the images that are produced by the digital imaging device ("imager"). More particularly, there is an opportunity to defer and/or distribute the processing between the digital imager itself and the target platform that the digital imager will ultimately be connected to, either directly or indirectly. Therefore, rather than attempting to invent a revolutionary way to get better hardware performance (i.e., better silicon technology) or a revolutionary compression technique, the approach of the present invention is to decrease the actual computation that occurs at the digital imager: perform a partial computation at the digital imager device and complete the computation somewhere else—somewhere where time and size are not an issue (relative to the imager). In other words, recognizing that the images captured by a digital camera will typically end up on another computing device, the approach of the present invention is to take advantage of that fact by "re-architecting" the digital camera to defer resource-intensive computations, thereby substantially eliminating the processor requirements and concomitant battery requirements for digital cameras. Further, the present invention adopts an image strategy which facilitates transmission of images, thereby facilitating the wireless transmission of digital camera images.

For purposes of determining how to defer and/or distribute processing, the overall process of digital imaging, from capturing a light image to storing a digital representation of that image, may itself be viewed as comprising various subprocesses. Once individual subprocesses are identified, one can investigate various approaches for deferring and/or distributing those subprocesses to other devices. Consider, for instance, a decision to defer image compression. Such an approach entails immediate problems, however. The digital camera must have sufficient resources to store, at least temporarily, uncompressed images, which tend to be quite large in size. Although storage technology (e.g., flash memory) can be expected to have ever-increasing capacity, present-day storage technology makes that approach unattractive, if not impractical. Another difficulty posed by that approach is that the digital camera must exchange images in an uncompressed format with the target device (e.g., desktop computer). Again, such an approach is unattractive since it would require the user to spend an inordinate amount of time transferring images to the target device, given the limited bandwidth that is commercially feasible for downloading pictures from a digital camera. Therefore, an approach of eliminating compression is not attractive, unless one can somehow obtain massive storage and bandwidth capacity for the digital camera. The immediate challenge posed by a deferred/distributed processing approach, therefore, is how one can accomplish the approach in a manner that does not contradict the ultimate goal of obtaining quality digital images on a portable digital camera. To address this challenge, the entire imaging process, including its individual elements, is examined in order to figure out how the process can be reproduced in a manner that compute-intensive portions of the process are performed somewhere other than the digital camera itself, but done so in a manner that does not compromise the image information necessary for reconstructing a digital image of acceptable quality.

B. Distributed Image Processing

As illustrated in FIG. 1B, the imaging process approach of the present invention includes a rapid foreground process to capture and compress the image (e.g., one-second cycle) and a slower background process to further compress and transmit the image. The foreground process is optimized for speed to facilitate continuous rapid snapshots while the background process is optimized for power. As shown, the two-stage processing mechanism is assisted by an imaging processing server, the "PhotoServer," which typically includes Internet connectivity.

The first stage, the foreground stage, is performed in the camera itself. This stage produces a highly-compressed image based on wavelet transform technology. This image is stored on the 16 MB of digital film inside the camera. The image is then transmitted to the PhotoServer (target platform) via a packet-based protocol as a Progressive Photograph Format (PPF) file. Suitable protocols include, for instance, Transmission Control Protocol/Internet Protocol (TCP/IP) and Wireless Application Protocol (WAP). For a description of TCP/IP, see e.g., Parker, T. et al., *TCP/IP Unleashed*, Sams Publishing, p. 33 et. seq., the disclosure of the reference in its entirety being hereby incorporated by reference. For a description of WAP, see e.g., Mann, S., *The Wireless Application Protocol*, Dr. Dobb's Journal, pp. 56-66, October 1999, the disclosure of which is hereby incorporated by reference.

The PPF mechanism allows selective transmission of varying degrees of photographic significance while maintaining the remaining elements of significance on the digital film in the camera. A lower-quality image transmitted to the server can later be upgraded to a higher-quality version simply by synchronizing the remaining elements of significance stored in the PPF file. The second stage of the process, the background stage, is performed on the PhotoServer. This stage completes the image processing cycle and produces a high quality, color-balanced, compressed image in a standard file format such as JPEG. A similar second stage process also exists in a desktop implementation, the PhotoDesktop, for customers who wish to transfer images to a desktop computer (as the target platform) using a USB (universal serial bus) cradle accessory or other communication link.

Figure 3A:
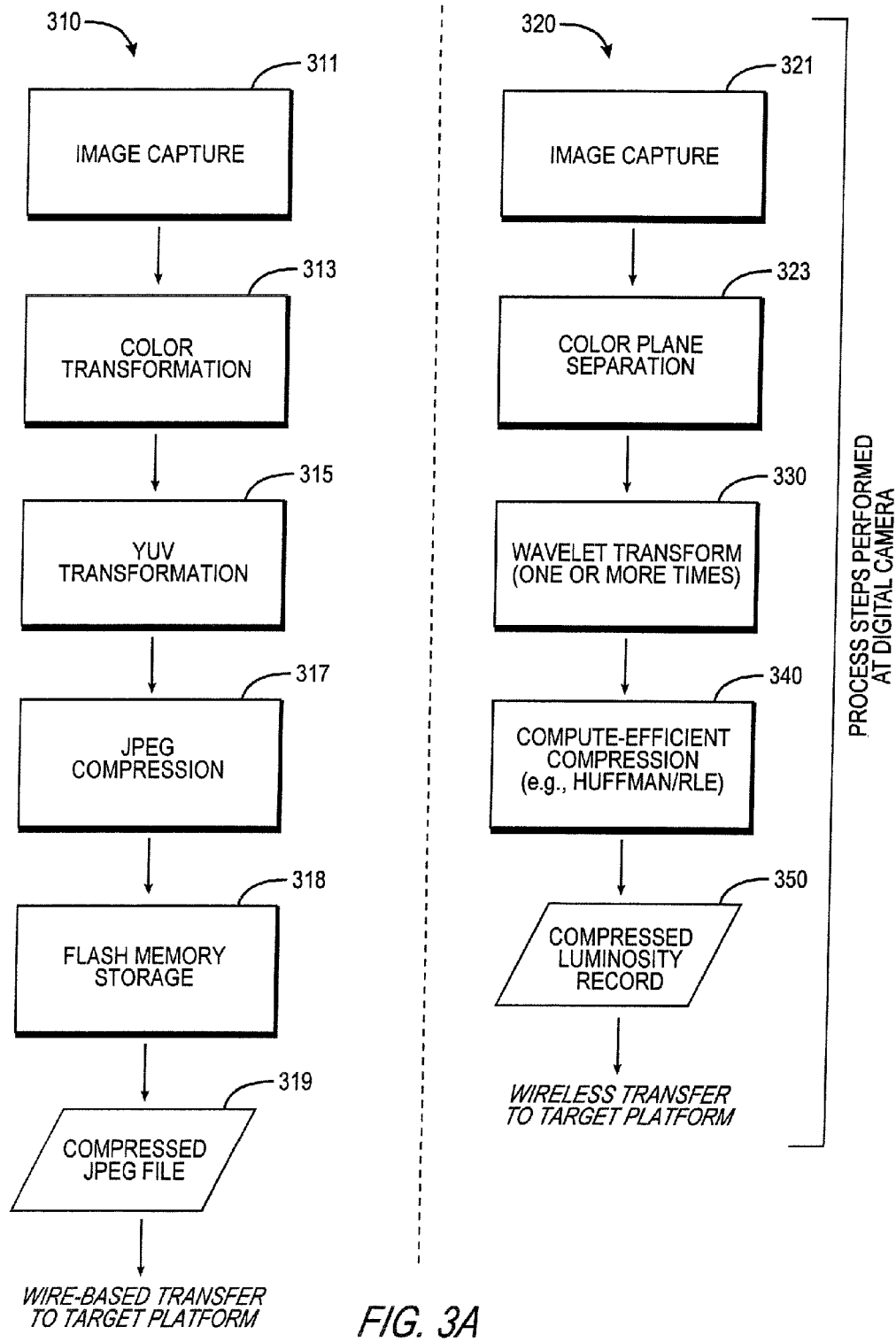
FIG. 3A is a block diagram illustrating a methodology of the present invention for distributed digital image processing (including contrasting it with conventional digital image processing).

Detailed construction and operation of the foregoing is perhaps best described by way of comparison with conventional digital image processing. FIG. 3A illustrates on its left-hand side a high-level process or methodology 310 that comprises the individual processes (i.e., subprocesses) or steps routinely employed for digital image processing. The digital imaging process or sequence 310 begins with image capture, as represented by capture block or capture process 311. This is the process of capturing light data (image) from a sensor and, in response, generating digital representations of that data (i.e., digital light levels based on the captured image). This is, in effect, an in-memory image of the light which has entered the camera's lens and struck the camera's CCD or CMOS sensor. It is interesting to note that at this point the digital camera has only captured light levels. Color information per se does not yet exist. Instead, color information, which must be inferred, is not determined yet at this point in the digital imaging process.

The capture process 311 is conventionally followed by a color interpolation (transformation) process 313, where color information may indeed be determined and applied to the image. In practice, the camera is able to infer color information based on captured luminance data and information that it knows about the individual pixels and where they lie within a matrix of color (pixels) that cover the surface of the camera's sensor. This information is now applied to the image by the color interpolation process 313, which is a compute-intensive process.

Because the human eye is more perceptive to certain colors than others, further processing of the image is required. The standard color space that the device "sees" the image in (e.g., RGB color space or model) is not necessarily the way that the human eye would view the image. For instance, the human eye has a certain distribution of retinal cones that are more sensitive to certain wavelengths of light. Therefore, in an effort to better match that expected by the human eye, YUV transformation process 315 maps or translates the image (e.g., RGB-based image) into YUV color space, a color model which takes into account luminance and chrominance. In YUV, Y is the luminance component, and U and V are the color or chrominance components. Luminance serves as a quantitative measure of brightness. Chrominance, on the other hand, reflects the difference in color quality between a color and a reference color that has an equal brightness and a specified chromaticity. In essence, the YUV transformation process 315 is a matrix transformation. Here, the red, green, and blue (RGB) values that apply to a particular piece of pixel data are multiplied by a vector which, in turn, translates the values into YUV color space. Although the individual transformation itself is not particularly complicated, the YUV transformation process 315 is applied to every pixel of the image and, thus, consumes a lot of processing cycles. Accordingly, the YUV transformation process 315 itself is also compute intensive.

Now, the image may be compressed as represented by compression process 317. The basic approach applied in image compression is to prioritize by the image data according to how a human eye would normally see it. In lossy image compression technique (e.g., JPEG), the chrominance levels that are less important to the human eye are compressed out. Luminance, which the human eye is more sensitive to, is given priority in the compression. Lossy techniques, which function largely by eliminating information that is the least significant to the human eye, are described in the technical, trade, and patent literature. See e.g., Nelson, M. et al., *The Data Compression Book*, Second Edition, Chapter 11: Lossy Graphics Compression (particularly at pp. 326-330), M&T Books, 1996. Also see e.g., *JPEG-like Image Compression* (Parts 1 and 2), Dr. Dobb's Journal, July 1995 and August 1995, respectively (available on CD ROM as *Dr. Dobb's/CD Release* 6 from Dr. Dobb's Journal of San Mateo, Calif.). The disclosures of the foregoing are hereby incorporated by reference.

After the foregoing lossy image capture process, the now-compressed image may be stored on persistent media. As indicated by processing block 318, conventional flash memory (or other suitable media) may be employed for this purpose, such as any one of the flash memory varieties previously mentioned. The end result is a compressed JPEG file 319, as shown.

The design goal of digital cameras today is to generate at the digital camera itself complete color images that are compressed in a standard image format (e.g., JPEG). This sequence, however, incurs multiple compute-intensive processes, including the color transformation process 313, the YUV transformation process 315, and the compression process 317, with the end result being a relatively-large image that is not well-suited for wireless transmission. In accordance with the teachings of the present invention, however, the foregoing design goal is not adopted. Note that the very color images that have been processed, at great computational expense, into a standard image format at the digital camera will ultimately be transferred to another device—another piece of computing hardware. If one assumes, for instance, that the images do not necessarily have to be exactly a color JPEG (or other standard image format) while stored on the digital camera, but that the images will be a color JPEG ultimately (e.g., target device), then one can begin to defer some of the processes required for processing digital images. In accordance with the present invention, image processing of a digital camera is performed in such a manner so as to retain the advantage of compression at the digital camera but remove the compute-intensive components of the process, so that they may be performed elsewhere (other than the digital camera itself). This process will now be described in further detail.

The approach of the present invention exploits the fact that there is really no such thing as "color sensitivity" on the digital camera. Instead, the camera uses a color inference transformation that employs a mosaic pattern of color pixels overlaid on a light-level sensor (e.g., CCD or CMOS sensor). For instance, as light shines through a red tile on the mosaic, it lights up the light-sensing element behind it. That element, in turn, records the luminosity observed. The digital camera may then employ its internal knowledge of the mosaic pattern—the specific arrangement of red, green, and blue pixels (of which there are a variety of standard patterns)—to infer the actual color. Each pattern itself tends to be a small, repeating pattern that is capable of being represented with a small amount of data. For example, a Bayer pattern will consist of a 2×2 pixel section (four pixels total) of two green pixels on one diagonal and a red and blue on another diagonal that is repeated over and over again. A simplistic approach to using the light information arriving at a particular pixel section is to merge together (i.e., matrix transformation) the information to produce four pixels having the same RGB level, at one quarter the resolution, but with accurate color data. Another approach is to take into account the luminosity observed at each of the pixels, so that not only is color information incorporated into the image processing but also the sharpness that is being perceived by each sensor as well.

The color interpolation process does not itself enhance the image data. Although it is certainly required for ultimately rendering a color image, it itself need not necessarily be performed at the digital camera and can therefore be deferred. Stated differently, if the knowledge of the color pattern can be placed somewhere else and the color image need not be completely generated right away (i.e., at the digital camera), then the step or process of transforming the originally-captured image into a color image may be deferred. In accordance with the present invention, the color interpolation and transformation process is in fact deferred altogether. Instead, the R, G, B color planes are separated and compressed. The compressed images are packaged into a single stream with header information to identify the individual bit-streams. The combined bit-stream may then be transmitted to the target device, with a small descriptor of what Bayer pattern should be applied either being transmitted to, or being assumed by, the target device.

The right-hand side of FIG. 3A illustrates a preferred methodology 320 for digital image processing in accordance with the present invention. At the outset, an image is captured by capture process 321, in a manner similar to that previously described for capture process 311. At the moment the shutter button is depressed, the sensor captures a full detail mosaic in two phases. The first phase is captured with the mechanical shutter closed, the second with the shutter open. Both phases happen in rapid succession, with the first being used to normalize the black level of the second. The mosaic is then fed into a linearization filter using the coefficients from the last preview frame prior to shutter click and serialized to DRAM. The image is also scaled to match the operator-selected image-capture resolution. Any aberrant pixel data should fall outside of the dynamic range provided by the histogram and consequently be canceled out.

Next, the color interpolation or transformation process is entirely avoided. Instead, the methodology 320 immediately moves to extraction of the color planes, shown as color plane separation process 323, followed by a wavelet transform process 330 to prioritize information in the color planes. Here, the separated color planes are fed into a wavelet transform image—that is, a preferably hardware-implemented (for performance) wavelet transform process. Over a series of repeated cycles, the wavelet engine transforms the luminosity image in place in DRAM.

The wavelet transform process itself may be thought of as a process that applies a transform as a sequence of high- and low-pass filters. In operation, the transformation is applied by stepping through the individual pixels and applying the transform. This process, which creates an image that contains four quadrants, may for instance be performed as follows. First, a high-pass transform then a low-pass transform is performed in the horizontal direction. This is followed by a high-pass transform then a low-pass transform performed in the vertical direction. The upper-left quadrant is derived from a low-pass horizontal/low-pass vertical image; the lower-left quadrant comprises a high-pass horizontal/low-pass vertical image; the upper-right quadrant comprises a low-pass horizontal/high-pass vertical image; and the lower-right quadrant comprises a high-pass horizontal/high-pass vertical image. The result of this is that the information most important to the human eye (i.e., the information that, from a luminosity or black/white perspective, the human eye is most sensitive to) is in the high-priority "low/low" quadrant, that is, the upper-left quadrant which contains the low-pass horizontal/low-pass vertical image. Most of the information in the other three quadrants, particularly the lower-right quadrant, is fundamentally zero (when based as an onset of a center frequency), that is, image information that is least perceived by the human eye. Thus, the low/low quadrant is considered the highest-priority quadrant, with the remaining quadrants being considered to be of much lower priority.

The transform is a completely reversible process, such that the original image (luminosity record) may be restored without loss of information. In practice, however, some information is lost as a result of the process being performed digitally, as digital computing devices are of course only able to perform real number math with finite, not infinite, precision. Nevertheless given enough digital significance (that is typically available with processors today), this loss is imperceptible to the human eye. The human eye is perceptive only to a bit depth in the range of about five to six significant bits of image data (based on a certain center frequency). As a result, processing the image with even modest processing capability (e.g., a bit depth of 16 significant bits) generates a transform that is reversible in a manner that is not perceptible to the human eye. Here, the image data is arranged without any reliance on color in such a way that the information most important to the human eye is one-quarter of its original size. If desired, the best-perceived quadrant (e.g., the upper-left quadrant for the example sequence above) may be used as a basis to provide the user with a black and white image at the digital camera (e.g., for preview purposes).

In basic operation, the transform process consists of processing the image as a whole in a stepwise, linear fashion. For instance, when processing the image in a horizontal direction, one would take a horizontal vector of image data (e.g., seven horizontal neighboring pixels) and multiply that by a predetermined set of coefficients (e.g., seven coefficients for a seven-pixel vector). This yields a single pixel value. Then the process continues in a sliding-window fashion by shifting over by some number of pixel(s) (e.g., two pixels), for processing the next vector of seven horizontal neighboring pixels. Further description of the wavelet transform process may be found, for instance, in the technical and trade literature. See e.g., Pigeon, S., *Image Compression with Wavelets*, Dr. Dobb's Journal, August 1999, pp. 111-115. The disclosure of the foregoing is hereby incorporated by reference, for all purposes.

Figure 3B:
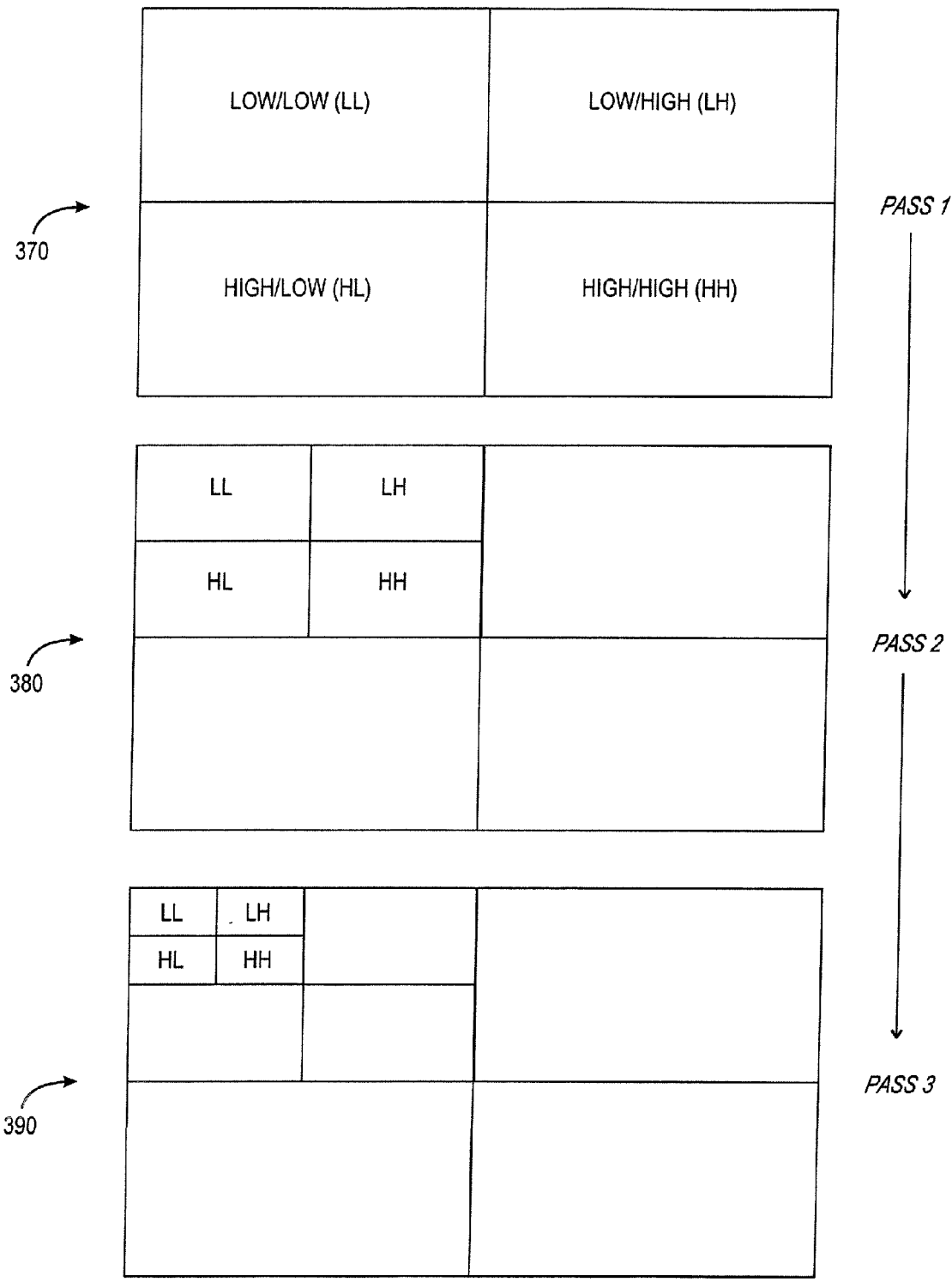
FIG. 3B is a block diagram illustrating a multi-pass wavelet transform process.
Figure 3C:
FIGS. 3C-I are black and white photographic images that compare the results of JPEG compression with wavelet transform.
Figure 3D:
Figure 3E:
Figure 3F:
Figure 3G:
Figure 3H:
Figure 3I:

As illustrated in FIG. 3B, the wavelet transform process may be repeated multiple times, if desired. When repeated, the process of applying high- and low-pass filters is repeated for the low/low quadrant of the then-current image (i.e., the prior result of high-pass horizontal and vertical filtering), again generating a four-quadrant image. For instance, as shown in FIG. 3B, the wavelet transformed image 370, which has already undergone a first pass of the wavelet transform, is subjected to another pass of the wavelet transform process to generate wavelet transformed image 380—that is, an image that has undergone two rounds of wavelet transformation. The process may continue in this fashion, for example, generating wavelet transformed image 390. Each time, the subsequent pass is performed on the prior-resulting low/low quadrant. Those skilled in the art will recognize that other quadrants could also be decomposed in a similar manner. This process may continue recursively until the desired transformed image is obtained. Whether the image is transformed with a single pass or multiple passes, the end result is still a wavelet transformed image. This image is "quantized" (i.e., reduced in bit-depth) by dividing the wavelet coefficients (i.e., the numerical value of the pixels in the wavelet transformed image) by a quantization scale factor. The quantization can differ from one band to another. The quantizations step sizes will be included in compressed bit-stream and will be used by the decompression system (e.g., on the desktop/server) to reverse the above process. Note that quantization and dequantization leads to loss of precision in the wavelet data and represents the lossy part of the compression. After quantization, the wavelet coefficients are compressed losslessly by one of several generic binary compression techniques (e.g., bit-plane decomposition of bands, followed by arithmetic coding).

After generating the wavelet transformed image, therefore, the preferred methodology 320 of the present invention proceeds to apply compression to the image. At this point, the image information (i.e., all quadrants and subquadrants) can be compressed as if it were fundamentally just a normal binary file. Thus, one can apply a simple, conventional compression, as a compute-efficient compression process, as indicated by compression process 340. In a preferred embodiment, the compression is performed in succession stages. First, run-length encoding (RLE) is applied to compress the image data. RLE itself is a simple, well-known technique used to compress runs of identical symbols in a data stream. The insignificant regions of the image data (i.e., the low-priority quadrants) tend to be predominantly centered around a single value; these can be compressed substantially. When applying run-length encoding to this type of information, for instance, one gets extremely long runs of similar data. The image is serialized to flash memory during the encoding process to free the DRAM for the next image capture. The entire cycle from image capture through stage one compression and serialization to flash is rapid (e.g., less than one second) for the highest quality mode. The camera is then ready to take another photograph. RLE, which typically encodes a run of symbols as a symbol and a count, is described in the patent, technical, and trade press; see, e.g., Zigon, Robert, *Run-Length Encoding*, Dr. Dobb's Journal, February 1989 (available on CD ROM as *Dr. Dobb's/CD Release* 6 from Dr. Dobb's Journal of San Mateo, Calif.), the disclosure of which is hereby incorporated by reference. In addition to RLE, the methodology 320 may include discarding low-priority data in order to provide more aggressive lossy compression.

This target result may then, in turn, be further compressed using Huffman coding, for generating a final compressed luminosity record 350 that is suitable for storage on a digital camera and for wireless transmission. Huffman coding is a method of encoding symbols that varies the length of the symbol in proportion to its information content. Symbols with a low probability of appearance are encoded with a code using many bits, while symbols with a high probability of appearance are represented with a code using fewer bits. Huffman coding is described in the patent, technical, and trade press; see, e.g., Nelson, M. et al., *The Data Compression Book*, Second Edition, Chapters 4 and 5, M&T Books, 1996, the disclosure of which is hereby incorporated by reference.

The wavelet transform-based compression used in the digital camera 100 achieves significantly better image quality than traditional JPEG compression used in other digital cameras. The image comparisons presented in FIGS. 3C-I illustrate this. The standard reference image for compression algorithms is the Lena image, shown in FIG. 3C in original uncompressed detail. The following image sets illustrate the resulting relative image degradation of wavelet and JPEG techniques for varying compression ratios. At an ultra-aggressive 48:1 compression ratio, the Lena image is still of reasonable quality using wavelet transform (FIG. 3E) while JPEG (FIG. 3D) has generated unacceptable pixelization. At a compression ratio of 32:1, the Lena image is showing better edge detail with wavelet transform (FIG. 3G) while JPEG (FIG. 3F) is still largely pixelized and unacceptable. At a compression ratio of 16:1, the fast quality compression ratio, wavelet transform (FIG. 3I) has produced a good quality image with good edge definition and few noticeable artifacts. JPEG (FIG. 3H), on the other hand, is barely approaching an acceptable image comparable with a wavelet ratio of 32:1 or more. Thus, the foregoing demonstrates that the wavelet transform-based compression technique produces far better shade continuity and edge detail than the equivalent JPEG.

Thus as described above, the camera-implemented portion of image processing (i.e., methodology 320) foregoes color processing. Instead of performing YUV transformation, the methodology performs wavelet transform compression on an image comprising a luminosity record. Further, JPEG-style compression, which is fairly compute-intensive, has been removed. Instead, the methodology 320 applies generic binary compression (e.g., run-length encoding and Huffman coding), which is far less compute-intensive. Note in particular that, up to this point, image compression in accordance with the present invention has been performed in a manner which is largely lossless, not lossy. Loss of image information at this point, which is quite small, is due only to digital rounding errors. If desired, however, additional compression techniques, including lossy ones, may be applied (e.g., at additional compression process 340). For instance, the image may be further compressed by reducing the bit depth in the low-priority quadrants.

The end result is that the amount of processing necessary to go from a captured image to a compressed record of the captured image (i.e., a record suitable for storage on the digital camera) is substantially less than that necessary for transforming the captured image into color and then compressing it into a color-rendered compressed image. Further, the resulting compressed luminosity record, because of its increased compression ratios (e.g., relative to conventional JPEG), facilitates wireless (or other limited bandwidth) transfer of images to target platforms.

The compressed luminosity record 350 is of course optimized for generation and storage on a digital camera, not for viewing by the user. Thus at the point where the compressed luminosity record 350 is transferred to another computing device (e.g., images downloaded to a desktop computer), image processing crosses over the distributed boundary to continue image processing on the target platform. In the currently-preferred embodiment, this is done via wireless transmission. Whenever the camera is connected to the cellular holster via the Hot-Shoe clip, a background process is initiated to transmit any pending compressed PPF photographs to the PhotoServer for final processing. The process is transparent to the user, requiring no operator intervention and can occur while the camera is in low-power mode. Using WPTP as the transport layer, the process can be interrupted at any time without worry of any data corruption or need to re-send already-transmitted packets.

Estimates for wireless transmission times follow in the tables below. These estimates are shown with varying operator-selectable image resolution and varying operator-selectable image quality. Image quality is a factor of compression ratio. As compression ratios increase, more loss of significant image data occurs.

TABLE 2

Wireless Transmission Times Assuming a 10 Kbps Transmission Rate

| Quality | Resolution | | |
|---|---|---|---|
| | Photographic 1280 × 1024 | Standard 1024 × 768 | Internet 512 × 384 |
| High (4:1) | 255 seconds | 153 seconds | 38 seconds |
| Standard (8:1) | 126 seconds | 76 seconds | 19 seconds |
| Fast (16:1) | 63 seconds | 38 seconds | 8 seconds |

TABLE 3

Wireless Transmission Times Assuming a 56 Kbps Transmission Rate

| Quality | Resolution | | |
|---|---|---|---|
| | Photographic 1280 × 1024 | Standard 1024 × 768 | Internet 512 × 384 |
| High (4:1) | 51 seconds | 31 seconds | 8 seconds |
| Standard (8:1) | 23 seconds | 15 seconds | 4 seconds |
| Fast (16:1) | 13 seconds | 8 seconds | 2 seconds |

As an option, an operator can also transmit the PPF photographs to a personal computer via the USB cradle. This process employs the same packet-based communication protocols except that it happens over a wire-line connection and in the foreground. Photographs transmitted to the PhotoServer or to the PhotoDesktop can be synchronized using sections of the PPF file. Synchronization is the act of supplying any supplemental data to images in order to enhance them to the maximum quality PPF record available. For instance, synchronization of a fast-quality PPF file and a high-quality PPF file of the same image will result in enhancement of the fast-quality image to high quality.

The Progressive Photograph Format (PPF) itself comprises a sequence of sequential image sections ordered by decreasing optical significance. The first section is the most significant image data and represents a complete fast-quality version of the image. This is followed by sections two and three which contain subsequent detail data to enhance the image to normal quality and high quality, respectively. Using the PPF approach, a fast-quality image can be transmitted to the PhotoServer, taking maximum advantage of transmission data size and speed. The server image can then be synchronized with the remaining components of the PPF file at a later time to restore the image to its original maximum quality. With this unique approach, the operator does not have to sacrifice image quality in order to maximize wireless throughput.

Now, the remainder of image processing can be performed at the target platform (e.g., server or desktop computer) in a straightforward manner, without the size and portability constraints that are imposed on the digital camera. Moreover, one can apply all of the processor capability of the target platform. Note, however, that the foregoing approach may be modified so that the image is (optionally) color processed at the digital camera (e.g., for viewing as a color JPEG file), yet transmitted as a PPF file, thus preserving the high-compression benefit for wireless transmission.

Figure 4A:
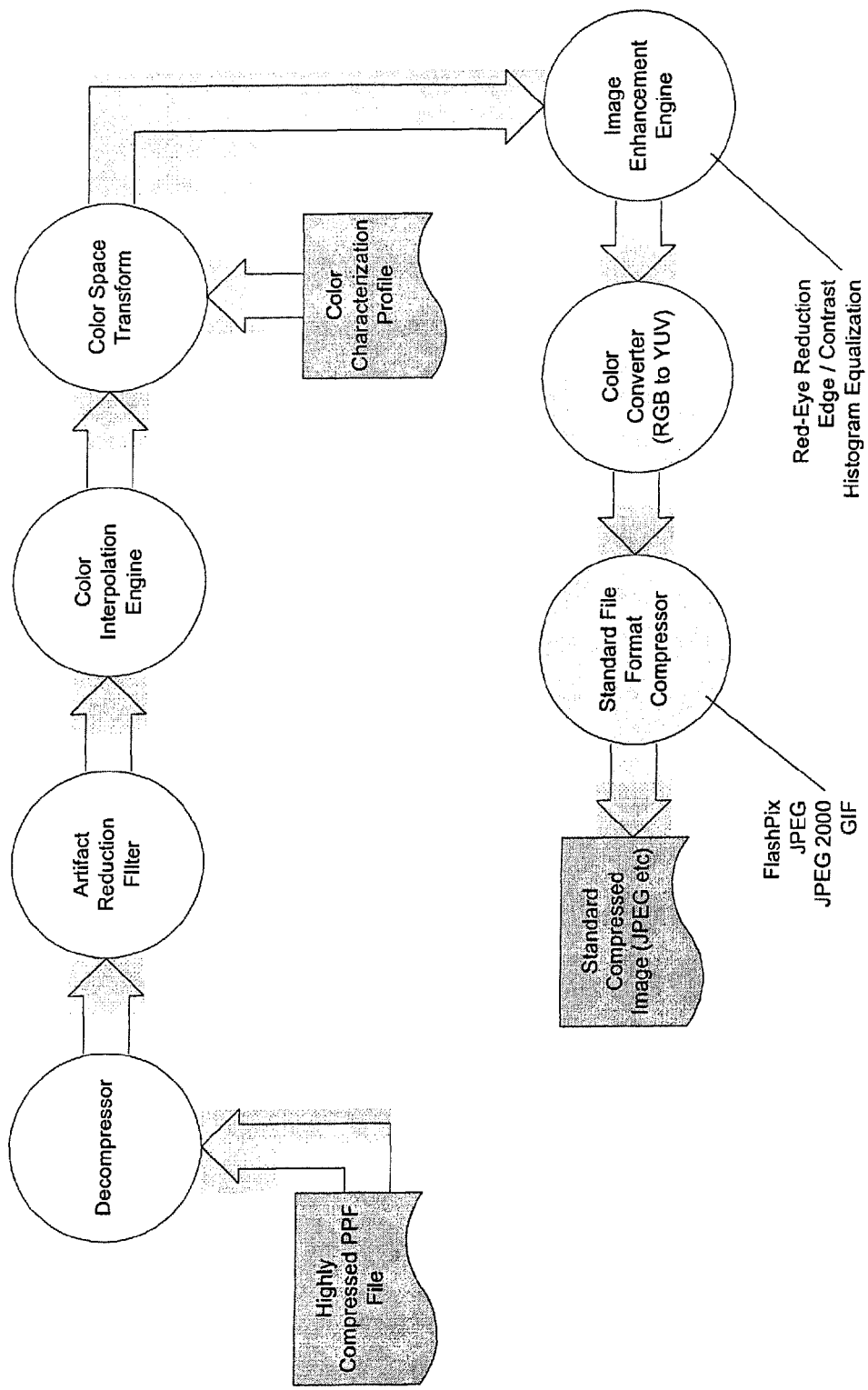
FIG. 4A is a block diagram illustrating overall processing at a target platform (e.g., server or desktop computer).

FIG. 4A provides an overview of the completion of image processing at the target platform. The PhotoServer receives highly compressed PPF files from the digital camera and completes the image processing cycle. In the decompression phase, a decompressed image is reconstructed from the PPF file. The resulting image is then run through an artifact reduction filter which compensates for artifacts introduced by the camera during the compression process. The result is then arranged into the original sensor color mosaic. The image is then processed by the color interpolation engine, which removes the mosaic pattern and produces a high-quality color image. The resulting image is in the RGB color space. Next the color characterization profile of the specific camera (recorded at factory assembly time) is used to balance the colors in the image to match human color perception. This stage makes up for the differences in how the camera sensor and the human eye see color. The image enhancement phase is optional. In this phase the balanced color image is processed to reduce red-eye artifacts, to enhance contrast, to harden and smooth edges, or even to interpolate to a higher resolution. Finally, the image is again compressed. The resulting output is an industry-standard, high-quality color image file such as JPEG, JPEG 2000, or FlashPix.

Figure 4B:
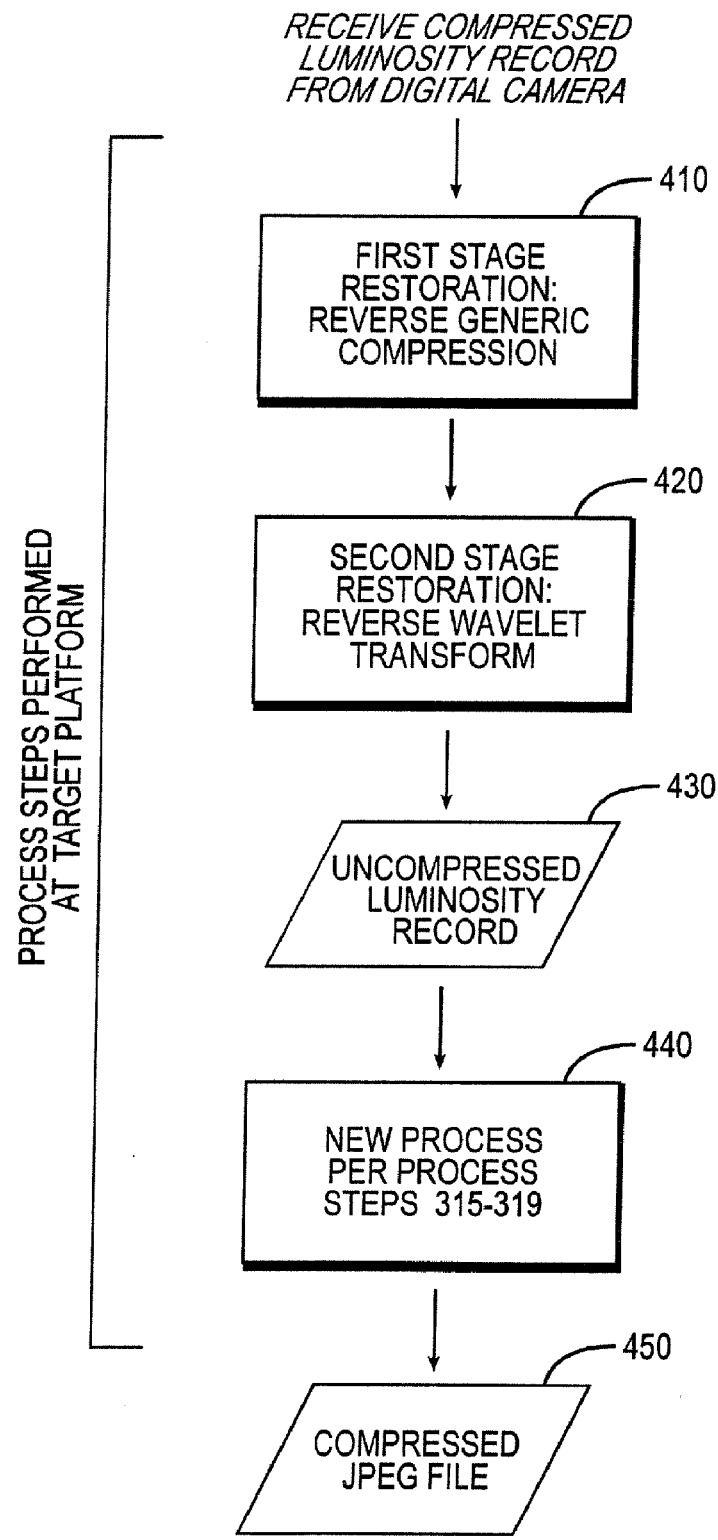
FIG. 4B is a block diagram illustrating method steps of the present invention for completing image processing at a target platform (e.g., server or desktop computer).

FIG. 4B illustrates specific method steps involved at the target platform. First, the decompression process 410 decompresses the compressed luminosity record (e.g., reversing the Huffman coding and RLE compression). Thereafter, the wavelet transform is reversed, for restoring the uncompressed luminosity record. This is illustrated by the inverse wavelet transform process 420. Reversing the wavelet transform process yields an uncompressed luminosity record 430—that is, a record of that which was originally sent from the camera's sensor, in full resolution. As previously noted, some loss of information from the original luminosity record may result, but it is typically at a rate that is imperceptible to the human eye. It is possible to have near lossless compression/decompression but, in the preferred embodiment, some controlled loss is accepted in order to further optimize the process (e.g., avoid adding precision that would not result in better image quality, as perceived by the user). As indicated by process block 440, conventional image processing (e.g., process steps 315-319) can now be applied to the uncompressed luminosity record for generating a color image for storage in a desired (e.g., typically standardized) file format. The end result is that one still ends up with a color digital image stored in one of the standardized formats (e.g., JPEG image 450). After processing the image, the PhotoServer may conveniently be used to further propagate the image, such as making the image available over the Internet to a multitude of other users (e.g., family and friends of the camera user). The image may, of course, also be rendered in hard copy, using a printing device available to the computer.

Note that, in accordance with the teachings of the present invention, the compute-intensive elements of digital image processing have been deferred such that they need not be performed at the digital camera but, instead, are deferred until the image arrives at the target platform (e.g., more powerful desktop or server computer). In this manner, the amount of processing capability required at the camera is decreased, or for a given level of processing power the images may be processed faster at the digital camera. Additionally, the bandwidth required to transmit images from the digital camera to the target platform is substantially reduced, thereby facilitating wireless transmission of the images. At the same time, the present invention accomplishes this without losing the advantages of high compression, such as decreased storage requirement and decreased transmission time for downloading images.

Efficient Color Space Transformations for RGB Mosaic Images

A. Overview

Figure 5:
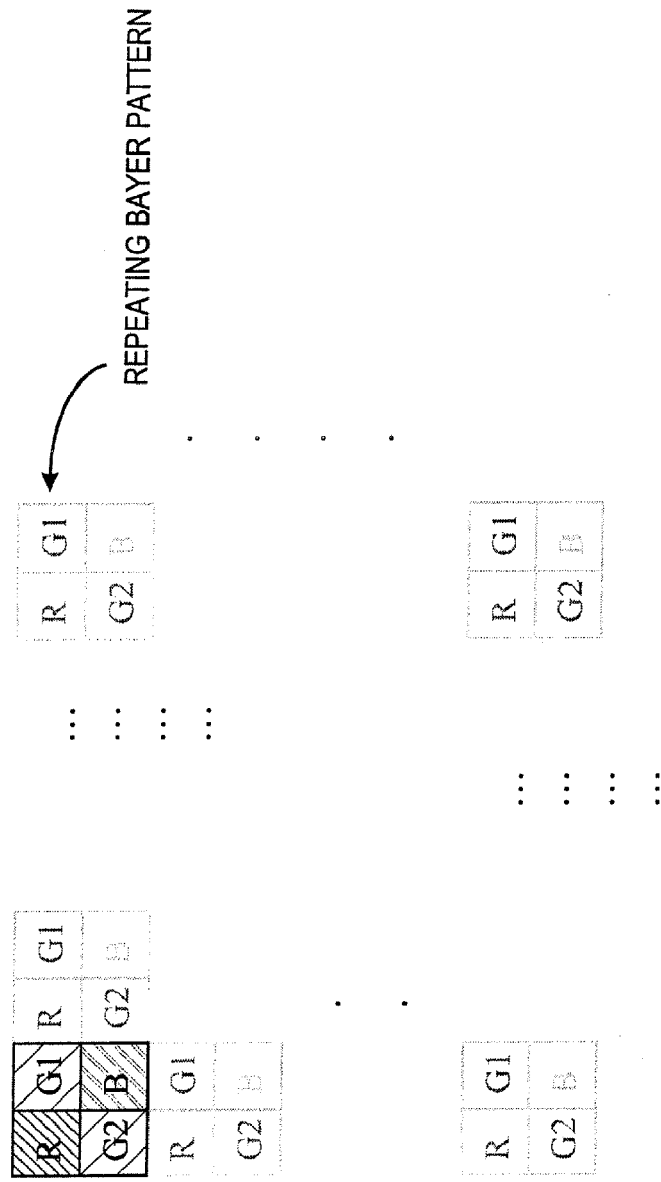
FIG. 5 is a block diagram illustrating a sample color filter array comprising a repeating pattern of red, green, and blue filters.

As previously described, digital cameras capture color images using CMOS or CCD sensors. The sensors are 2D arrays of individual pixels that can capture luminance information. To capture color information, the sensors are overlaid with a 2D color filter array (CFA). The color filter array is a repeating pattern of red, green, and blue filters. An example pattern is shown in FIG. 5.

The captured sensor image can be quite large (>1M pixel for 1280×1024 sensor pixel array) and is typically compressed by the digital camera for storage (or transmission). However, the RGB mosaic pattern is not well suited for compression, as the Red, Green, and Blue planes are strongly correlated—that is, the pixel values track together. Consider, for instance, the task of compressing an RGB image (i.e., compressing each plane separately). Here, the pixel values of each plane correlate with corresponding pixel values of the other planes. The Green plane comprises a monochromatic image (in Green) having pixel values that correlate closely with corresponding pixel values of the monochromatic images in the Red and Blue planes. At the image level, the image in the Green plane looks very similar to the image in the Red plane which, in turn, looks very similar to the image in the Blue plane. For example, all three planes track the same edge information. Since the pixel values are correlated, it is desirable to avoid expending effort compressing the correlated information of other planes; in other words, it is desirable to avoid compressing the same image information again and again. Therefore, a conversion to an uncorrelated color space like YUV is desirable. The RGB mosaic to YUV conversion is a computationally-expensive process, however. In accordance with the present invention, the conversion process is simplified to minimize the computations in the digital camera.

B. RGB Mosaic Conversions

1. Introduction

The human retina is overlaid with two types of sensors: "rods" and "cones". Rods are used in the dark; cones are used in bright light and are responsible for color perception. Humans perceive color through three types of cones on the retina which roughly correspond to the red, green, and blue parts of the electromagnetic spectrum. Correspondingly image sensors used in digital cameras use red (R), green (G), and blue (B) filters overlaid on a luminosity sensor array to simulate the color filtering action of the cones.

Figure 6A:
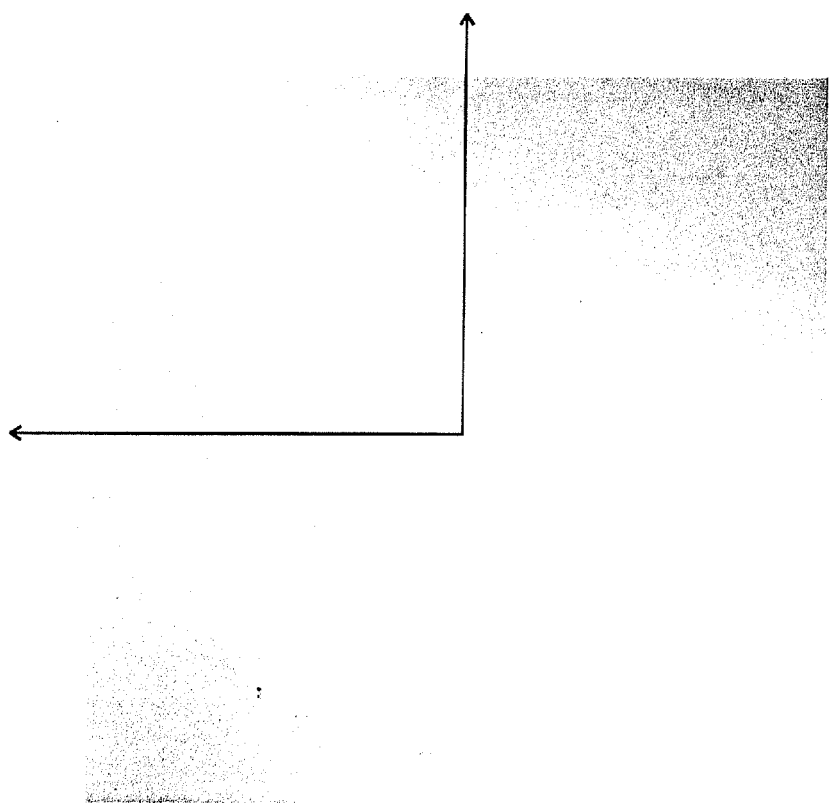
FIG. 6A is a diagram illustrating the YUV color space.

Though the R, G, B colors provide an easily-understood physical representation, they are not efficient for the encoding of color for transmission. This stems from the fact that there is a significant amount of "redundant" information in the colors. As a result, the YUV color space is often used instead. The Y plane corresponds to luminosity/brightness information and the U and V planes correspond to "chromaticity" information. FIG. 6A illustrates, for instance, the UV plane at a Y of 1.0 (where 1.0 corresponds to maximum brightness and 0.0 corresponds to minimum brightness).

The advantage of transforming to the YUV color space are three-fold:

(1) The Y plane corresponds to a monochrome representation of the image. Only this plane need be decoded by monochrome receivers, so monochrome receivers could coexist with color receivers. This was useful in the 1960s—during the transition from black and white to color TVs—but this advantage is not of much relevance today.

(2) Brightness information in the Y plane is more important to the human eye than "chromaticity" information in the U and V planes. These planes can be spatially subsampled (e.g., to one-quarter resolution) without significant loss of image quality. This approach of subsampling the U and V planes is used in image compression schemes to reduce the data to be encoded.

(3) The Y, U, and V planes are fairly "decorrelated" (e.g., as compared to R, G, B). There is significantly less "information" to be encoded in the U and V planes. Fewer bits per pixel can be assigned to code the U and V planes, thus further improving the image compression ratio that can be achieved.

In particular, the second and third advantages result in smaller compressed image sizes, which translates to lower memory storage requirements and lower transmission time over wireless or wire-line media.

Figure 6B:
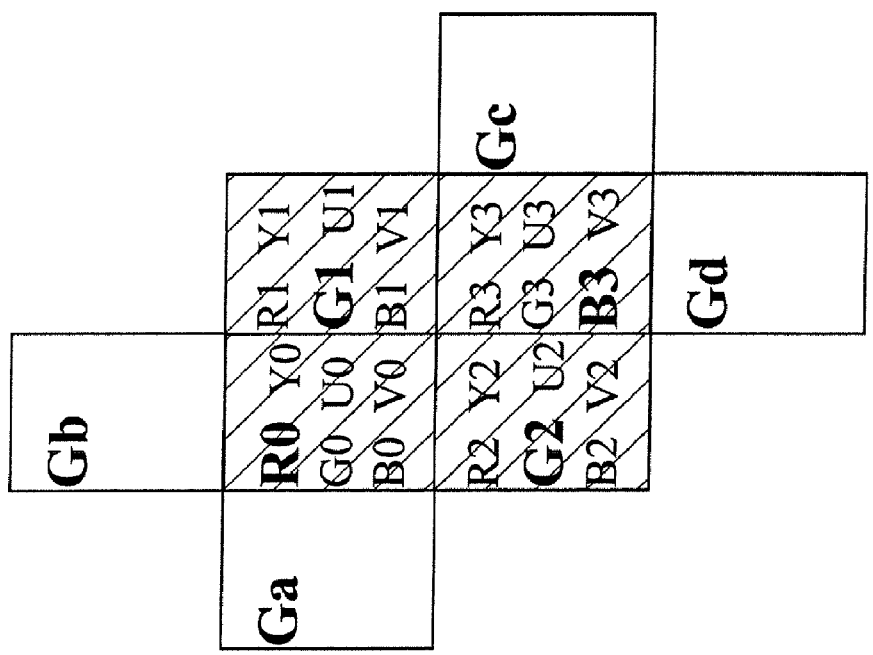
FIG. 6B is a block diagram illustrating a Bayer cell (2×2 pattern).

Current digital cameras perform the following steps to convert the RGB mosaic to YUV (luminance (Y) and chrominance (U,V)). First, the missing R, G, B values at each pixel are interpolated. Consider FIG. 6B which illustrates a Bayer cell (a 2×2 pattern in this example). Here, the captured color values are R0, G1, G2, B3—that is, the pixel values physically captured at the sensor. However, just relying on these four pixel values would yield poor image resolution. Therefore, image resolution is enhanced in a preferred embodiment by inferring or interpolating eight additional pixel or color (RGB) values (including G0, B0, R1, B1, R2, B2, R3, G3), from the four pixel values that have been physically captured. RGB to YUV conversion may then be performed at each pixel (whether physical or inferred). In the preferred embodiment, the following transformation equation is employed.

$$Y=0.301R+0.586G+0.113B$$

$$U=0.512R-0.430G-0.082B+128$$

$$V=-0.172R-0.340G+0.512B+128 \quad \text{Equations 1}$$

Those skilled in the art will appreciate that other transformation equations may be employed for this transformation without departing from the scope of the present invention.

Now, a form of lossy compression may be applied at this point by subsampling the planes. For the human eye, brightness (luminosity) information is more important than color information. Thus, for instance, the U and V planes can be subsampled by a factor of 2 in each dimension (i.e., one sample is retained for each cell), while still maintaining perceived image quality.

2. Preferred Methodology

In a preferred embodiment, the destination color space is preferably GUV, not YUV. It turns out that the Green plane is where one observes most of the luminosity information. Accordingly, the Green plane is the most important plane for image perception by the human eye. For instance, as seen in Equations 1 above, the G (Green) component receives the largest weighting when determining chrominance (Y).

$$Y=0.301R+0.586G+0.113B$$

To avoid the expense of converting to the Y plane (which entails, besides additional multiplication and addition operations, the expense of interpolating R and B values at each given location), the G plane is therefore instead employed.

The GUV space allows one to avoid the expense involved in going to YUV and serves to "decorrelate" the data (i.e., avoid highly-correlated information between R, G, and B planes)—that is, employing three separate planes having substantially less correlation between themselves. Although a significant portion of correlation between the three planes has been removed, GUV may provide less correlation than YUV transformation (e.g., because some color information remains in the G plane). However, GUV is preferred since it allows the system to avoid calculation of Y, thus trading some compression performance for computational efficiency. The GUV space of the present invention avoids the computational complexity of generating the YUV space, but yet generates most of the benefit.

In the GUV color space, the missing green pixels in the RGB mosaic are interpolated. Those green pixels interpolated at the red pixel locations are subtracted from the co-sited red pixels to generate the U plane. Similarly, the green pixels interpolated at the blue pixel locations are subtracted from the co-sited blue pixels to generate the V plane. The subtraction operation (i.e., "differencing") results in "decorrelation" (thereby achieving the YUV's third advantage described above). The subtraction operation can be generalized to weighted subtraction, where the green, blue, and red pixels are multiplied by a weighting factor before the subtraction. Since U and V are generated only at those locations where R and B exist, YUv's second advantage is retained (i.e., the U and V planes are at quarter the resolution of the green). The following tables show YUV and GUV values for typical colors.

TABLE 4

| Color | R, G, B (RGB space) | Y, U, V (YUV space) | G, U, V (GUV space) |
|---|---|---|---|
| Red | (255, 0, 0) | (76, 258, 84) | (0, 510, 255) |
| Green | (0, 255, 0) | (149, 18, 41) | (255, 0, 0) |
| Blue | (0, 0, 255) | (28, 107, 258) | (0, 255, 510) |
| Cyan | (0, 255, 255) | (178, −2, 171) | (255, 0, 255) |
| Magenta | (255, 0, 255) | (105, 237, 214) | (0, 510, 510) |
| Yellow | (255, 255, 0) | (226, 148, −2) | (255, 255, 0) |

Figure 7A:
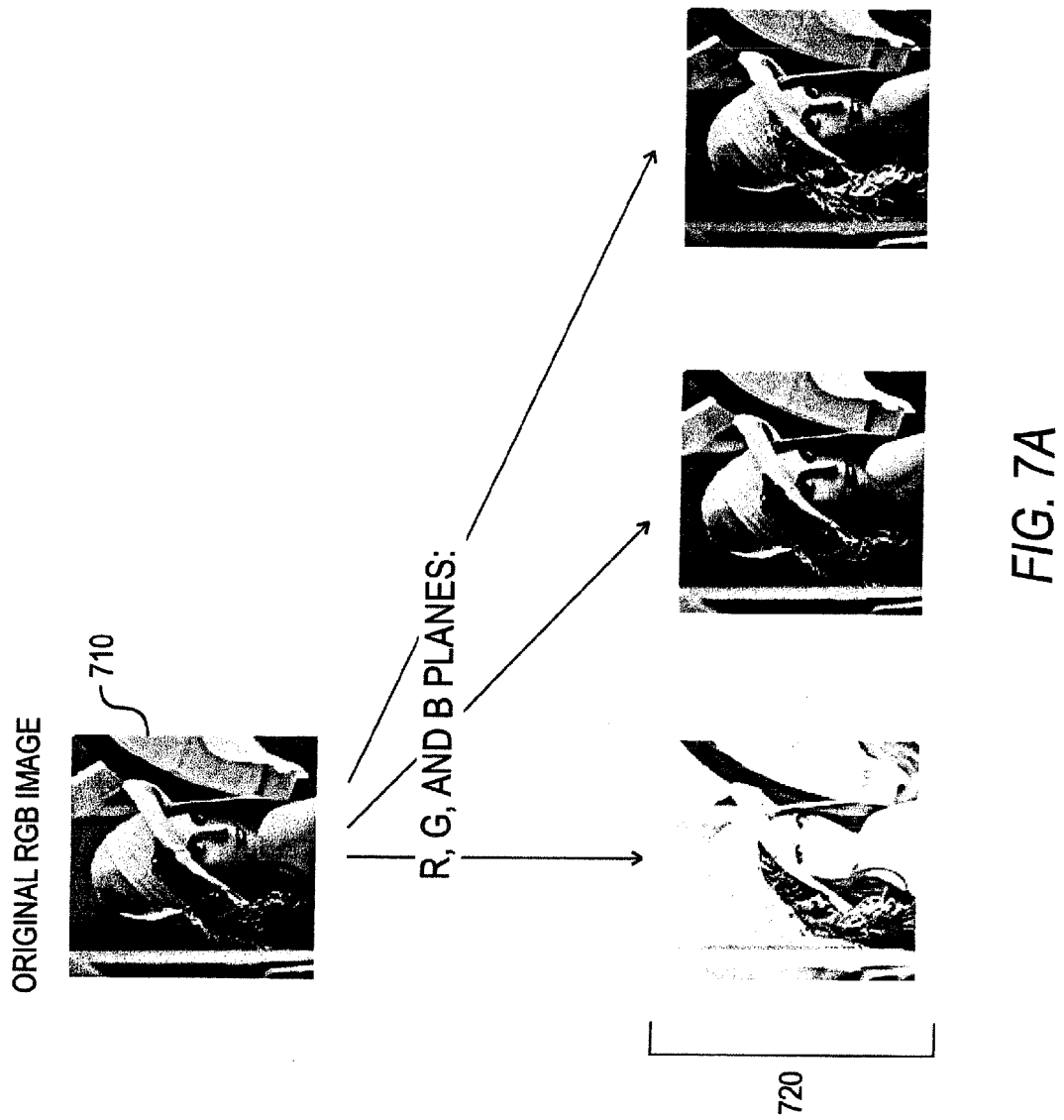
FIGS. 7A-B are bitmap images illustrating RGB, YUV, and GUV color spaces.
Figure 7B:
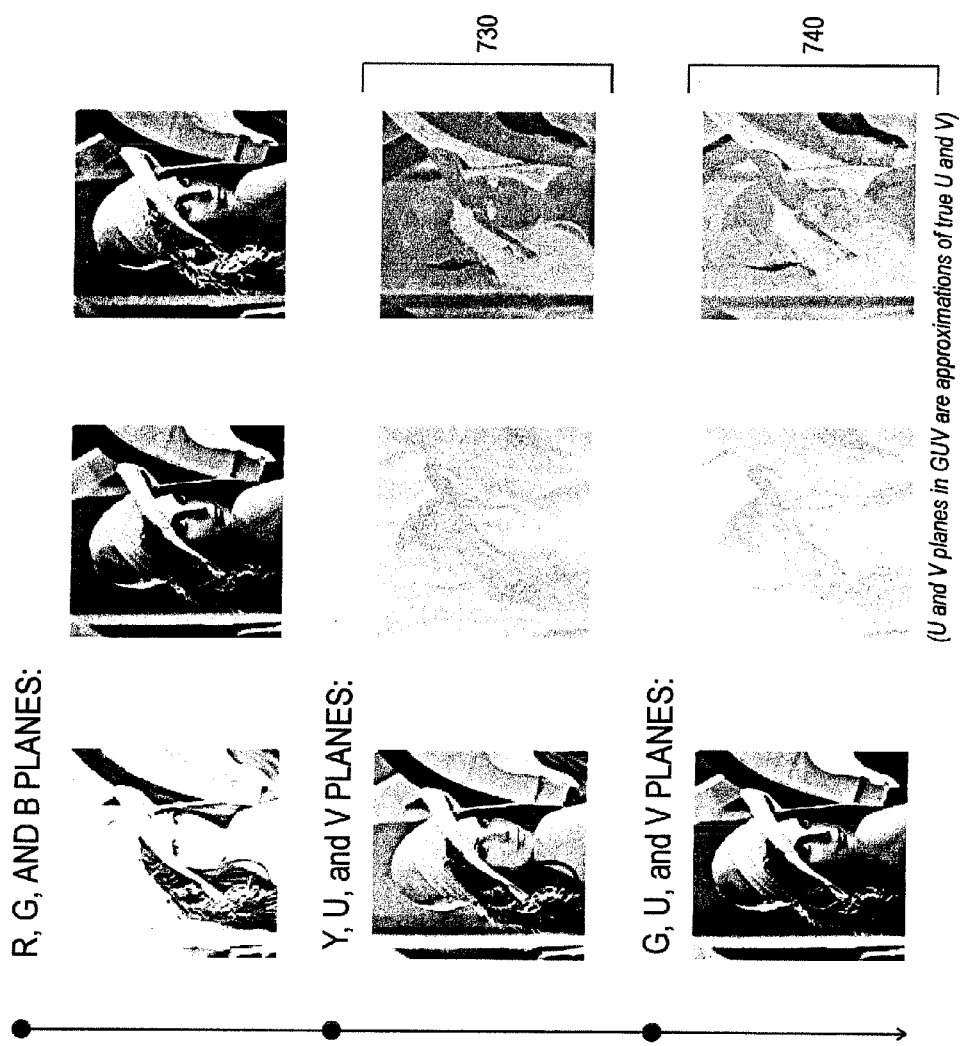

FIGS. 7A-B illustrate these color spaces. In FIG. 7A, RGB image 710 corresponds to individual R, G, B planes 720 in RGB space. FIG. 7B illustrates the corresponding Y, U, and V planes 730 for the image 710 in YUV color space and the corresponding G, U, V color planes 740 for the image 710 in the GUV color space.

To transform to GUV color space, the following color values are computed per cell, G0, G1, G2, G3, U, V (i.e., a single U and V for a cell), as follows (referring back to FIG. 6B):

$$G0=(Ga+Gb+G1+G2)/4$$

$$G3=(G1+G2+Gc+Gd)/4$$

$$U=R0-G0+255 \text{ Note: alternately } U=R0-(G1+G2)/2$$

$$V=B3-G3+255 \text{ Note: alternately } V=B3-(G1+G2)/2 \quad \text{Equations 2}$$

As shown, the U and V planes in the GUV color space are approximations of true U and V. As demonstrated by the similarity of the U and V planes in the GUV color space to the U and V planes in the YUV color space, the "decorrelation" advantage of YUV is preserved.

Note that other interpolation schemes could be used in accordance with the present invention for interpolating green—determining G0 and G3—other than the simple averaging scheme shown here. These include edge-based interpolation schemes, for example, the scheme described in U.S. Pat. No. 5,652,621, issued Jul. 29, 1997, the disclosure of which is hereby incorporated by reference.

The G, U, V planes are compressed separately and then packaged for transmission to a target destination (e.g., wireless transmission to server). In a preferred embodiment, the information is compressed using wavelet transform compression (as previously described above), followed by quantization (introduce loss into the compression by using fewer significant bits, e.g., using coarser coefficients), followed by entropy coding (e.g., arithmetic or Huffman coding). Alternatively, other transform-based compression, such as DCT-based (e.g., JPEG) compression, can be used in place of wavelet transform compression. At the server (or desktop), the following steps are performed. First, the G, U, V planes are reconstituted at the server by decompressing the compressed GUV information. Now, U and V planes may be interpolated to a standard color space (e.g., RGB) at full resolution at the server, by now computing R and B pixel values. The R and B values are computed using the following equation.

$$R = U + G - 255; B = V + G - 255 \qquad \text{Equation 3}$$

Once the image information has been reconstituted in RGB color space, one can transform the image information into other standard representations, such as YUV or CMYK, and other image file formats (e.g., JPEG or JPEG2000), as desired, for eventual presentation to a user. For example, the image information may be optionally transformed into the YUV color space by applying the standard RGB to YUV color conversion matrix transformation (e.g., as shown above for Equations 1). To render in JPEG (YUV), for instance, the system would first typically convert to YUV color space and then apply subsampling. Several matrix transformations are described in the literature, for example in Chapter 5 of *Digital video: An introduction to MPEG-2* (Haskell, B. G. et al., *Digital video: An introduction to MPEG-2*, Chapman and Hall, New York, 1997), the disclosure of which is hereby incorporated by reference. Any of these matrix transformations may be used, as desired.

After decoding to RGB color space, one may want to store images at the server or other destination device in GUV format at some point in time when the original-compressed GUV information is no longer available (e.g., image is rendered as a JPEG-compressed file and transmitted to another device). Typically, when one performs a re-compression, image quality suffers. In accordance with the present invention, however, it is possible to avoid re-encoding of the G, U, and V planes in instances where the color space has been decoupled from the compression scheme. This can be achieved through an image file format that not only stores the encoded color planes, but also stores a transformation (called a color profile) from the color space that is used to a standard color space, like the CIE Lab color space.

Figure 8:
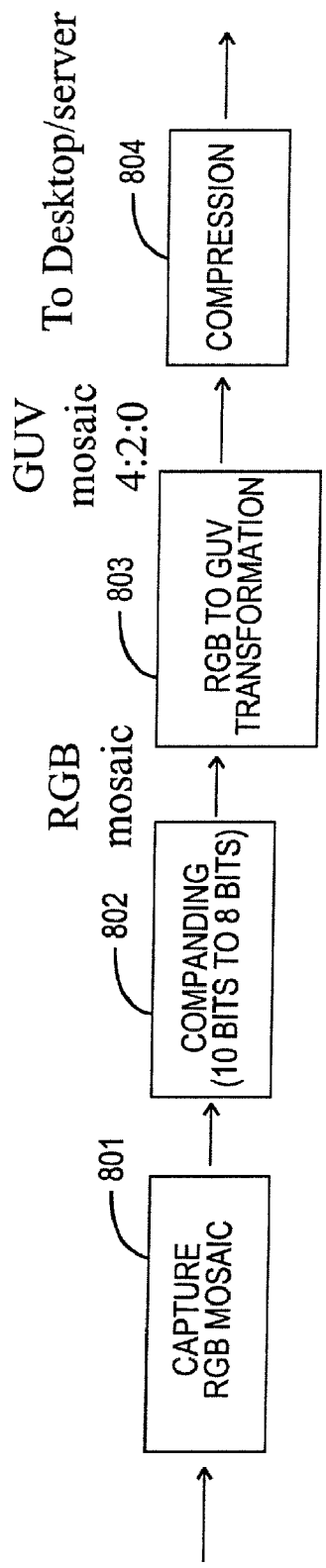
FIG. 8 is a block diagram providing an overview of the method of the present invention for efficient color conversion.
Figure 8:
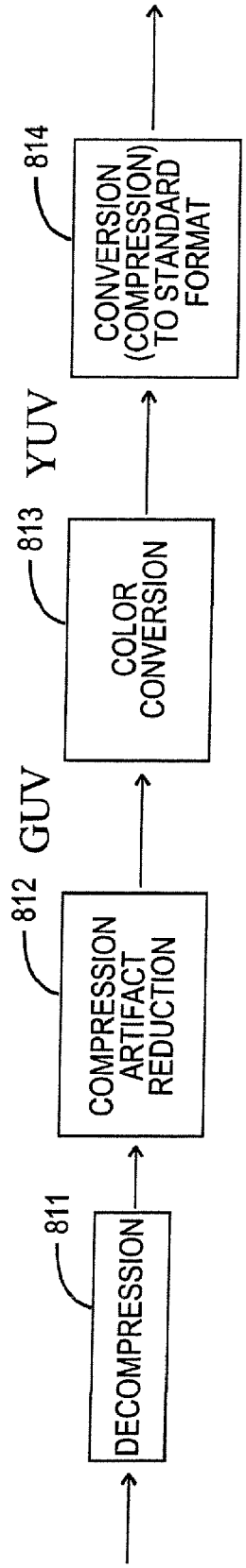

FIG. 8 summarizes an exemplary method of the present invention for image processing, using efficient color conversion. At step 801, an RGB mosaic (image) is captured using a solid state sensor array. At step 802, the captured image may be "companded". It is a well-known fact that the human eye does not perceive equal increases in luminosity as equal increases in brightness. Companding is the process of mapping the luminosity values captured by the image sensor into a space that is more linear to the human eye. As a computer-implemented process (e.g., software or firmware implemented), this mapping is typically performed through a look-up table that maps 10-bit sensor values to 8-bit values. Such non-linear mappings are discussed in the technical and trade literature; see, e.g., *Computer Graphics Principles and Practice*, by James D. Foley et al., 2nd Edition, Addison-Wesley Publishing Company, Reading, Mass., 1990, particularly at Chapter 13; the disclosure of the foregoing is hereby incorporated by reference.

In RGB color space, the image is represented by a primary channel comprising Green (G) and secondary channels comprising Red (R) and Blue (B). Now, at step 803, the image is mapped from RGB color space to GUV color space, using, for example, the above-mentioned RGB-to-GUV transformation. The GUV color space also includes primary and secondary channels, with the primary channel comprising (or substantially comprising) Green (i.e., corresponding to the primary channel of the RGB color space). During conversion, the primary channel of the GUV color space is interpolated to full resolution (but that may be deferred until after transmission to a target platform, if desired). The secondary channels of the GUV color space are computed as differences from the primary channel. Specifically, U is computed as a difference between Red and Green (i.e., difference from the primary channel), and V is computed as a difference between Blue and Green (i.e., also a difference from the primary channel), as follows:

$$U = R0 - G0 + 255$$

$$V = B3 - G3 + 255$$

where R0 is a non-interpolated Red pixel value, G0 is an interpolated Green pixel value (co-sited with R0), B3 is a non-interpolated Blue pixel value, and G3 is an interpolated Green pixel value (co-sited with B3). Once converted into GUV color space, the image may now be compressed at step 804, for instance using wavelet transform-based compression (as previously described). This yields a compressed, transformed image (GUV information) that may now be transmitted, using wireless or wire-line transfer, to a target platform (e.g., desktop or server computer).

At the target platform, the GUV information is now decompressed, as represented by step 811. Compression artifact reduction technique may be applied, for instance, as indicated at step 812. Typical compression artifacts include "blockiness" in JPEG compression (where the individual 8×8 blocks used during coding become visible) and "quantization noise" (where edge artifacts occur). Artifact removal techniques for wavelet transform-compressed images are described in the literature; see, e.g., *Coding artifact removal with multiscale processing*, by Jin Li and C. Jay Kuo in "Proceedings—IEEE International Conference on Image Processing '97," Santa Barbara, Calif., Oct. 27-29, 1997, the disclosure of which is hereby incorporated by reference. For JPEG-blocking artifact removal, see, e.g., Chapter 16 of the book *JPEG—Still Image Compression Standard*, by William B. Pennebaker and Joan L. Mitchell, Published by Chapman and Hall, 1992, the disclosure of which is hereby incorporated by reference.

Once the GUV information has been restored, it may now be converted into other color spaces, as desired. For example, step 813 illustrates conversion into YUV color space. Typically, the information at this point would be further processed into a standard representation, such as converting it into a standard JPEG-format image file. This is shown at step 814. Thereafter, the image may be displayed, further transmitted or processed, as desired.

3. Variations a. GUV Space Variation

A first alternative to the above approach is to use GUV space but without sending the G0, G3 (interpolated) values. Here, these interpolated values are derived at the server. In such an instance, the G plane transmitted from the client device to the target platform has half the pixels as the previous method. The G value will still have to be interpolated at the client device to compute the U value, but the G0, G3 values need not be compressed or transmitted to the target platform.

b. YUV Space Variation #1

Another alternative is to use YUV space rather than GUV space, but do so in a manner that avoids fixed-point multiplication operations by applying approximate color transformations. The following values are computed.

$$Y0=(R0+2G0+B3)/4;$$

// Note B3 is the non-interpolated Blue
// alternately (R0+2G0+B0)/4
// but this requires interpolating B3

$$Y1=(R0+2G1+B3)/4;$$

// alternately (R1+2G1+B1)/4
// but this requires interpolating R1,B1

$$Y2=(R0+2G2+B3)/4;$$

// alternately (R2+2G2+B2)/4
// but this requires interpolating R2,B2

$$Y3=(R0+2G3+B)/4; \qquad \text{Equations 4}$$

// alternately (R3+2G3+B3)/4
// but this requires interpolating R3

In this case it is possible to completely avoid re-encoding data (see description of the preferred GUV method above) as the Y plane is already available. YUV color space, however, comes at the expense of increased computation in the imaging device. As a result, GUV color space is employed in the currently-preferred embodiment.

c. YUV Space Variation #2

Another alternative approach in YUV space is to compute only Y1, Y2 values, as follows:

$$Y1=(R0+2G1+B3)/4$$

// Note: these are non-interpolated values
// alternately (R1+2G1+B1)/4
// but this requires interpolating R1,B1

$$Y2=(R0+2G2+B3)/4; \qquad \text{Equations 5}$$

// alternately (R2+2G2+B2)/4
// but this requires interpolating R2,B2

U and V are computed as described above. However in this variation, effective resolution suffers, when compared to the other approaches.

4. Advantages

This methodology of the present invention provides transformations that convert an RGB mosaic image to a more "compression-efficient" representation. The approach has several advantages. The GUV planes are more amenable to image compression than RGB mosaic. Image quality can be increased by assigning (relatively) more bits to code the G plane and fewer to U and V. Here, one applies more aggressive quantization to the U and V planes than the G plane. Further, the amount of computations in the imaging device is decreased. This leads to power savings or device size reduction, as less powerful processors and circuitry are needed (as compared to conventional digital cameras).

Methodology Providing Improved Response Time for Rapidly Taking Successive Pictures A. Introduction Both the limited on-camera storage and the time/power requisites for wireless transmission dictate that the RGB (or other color space) representations for each picture be compressed. The distributed compression invention (wireless) described earlier defers some of the compression processing to a remote platform where both time and space are not at the premium they are in the portable camera device. Although that methodology does shorten the latency between successive snapshots, further improvement to latency is desired. For example, segmenting and distributing some of the compression (to standard JPEG2000 format) reduces the on-camera processing time to half, albeit from approximately 40 seconds to 20 seconds. It is desirable to cut the latency between successive picture-taking even more.

B. General Design

The present invention subdivides the on-camera compression processing into two stages in order to take advantage of varying levels of execution priority for threads operating in a multi-tasking camera environment. The first stage employs a relatively simple compression technique that is selected for its fast operation (i.e., requires fewer processing resources), although it may not necessarily be as efficient in minimizing the file size. The first stage partially compresses the image quickly, and temporarily saves this record either in RAM or in flash memory. This approach immediately frees up both memory and processor resources of the camera, thereby facilitating the user's ability to continue shooting pictures without waiting for full compression processing of the current picture. The second stage of the on-camera compression, which employs more thorough compression, is deferred as a background process for when the user is no longer using the camera to take successive photographs.

More particularly, the present invention provides a two-stage compression embodiment, which hastens the recycle time for continuous picture-taking by assuming that the user will not take more than a few pictures (e.g., 3-6 pictures) in rapid succession. Upon the user taking a rapid sequence of pictures, the resulting records for the pictures, which have been partially compressed in accordance with the present invention, remain in a buffer in RAM either until the resources of the RAM are nearly exhausted or whenever the user relaxes the rate of successive picture-taking, at which time they may be written to flash memory. When the user ceases taking pictures, the second stage compression, which has a lower priority in the multi-tasking camera environment, proceeds.

Using this two-stage compression approach, the present invention reduces the latency between snapshots to a fraction of that otherwise required. The following table, Table 5, presents comparative processing time and file size compression ratios wherein both the YUV and GUV image transformations, described earlier, are implemented:

TABLE 5

Speed Advantage of First-Stage of the Two-Stage Compression of YUV Implementation

|  | Processing time (in seconds) | File size compression |
|---|---|---|
| Undistributed, full JPEG2000 compression within the camera | 40 | 1:20 |
| YUV distributed, but not using 2-stage compression in the camera | 20 | 1:20 |
| YUV distributed, high-priority, 1$^{st}$ stage of 2-stage compression | 5 | 1:4 |
| GUV distributed, but not using 2-stage compression in the camera | 15 | 1:20 |
| GUV distributed, high-priority, 1$^{st}$ stage of 2-stage compression | 3 | 1:4 |
| GUV distributed, low-priority, 2$^{nd}$ stage of 2-stage compression | 13 | 1:20 |

C. Operation
1. Overview

In accordance with the present invention, the digital camera device processes each snapshot or captured image according to the following three phases:

1. Pre-compression: industry-standard adjustments to the raw luminosity record of the captured image.
2. Stage 1 compression: speedy partial compression to both save space in the camera device and to enable the user to proceed taking subsequent snapshots. In the currently-preferred embodiment, this is specified as a high-priority task in the multi-tasking environment on the camera device, which results in an approximate file size compression ratio of 1:4.
3. Stage 2 compression, which performs the following steps:
   a. Decompression of the stage 1-compressed luminosity records to their approximate state, which followed the pre-compression processing.
   b. High compression of the luminosity record to minimize the file size. In the currently-preferred embodiment, this is specified as a low-priority task in the multi-tasking environment on the camera device, which results in an approximate file size compression ratio of 1:20.

Figure 9A:
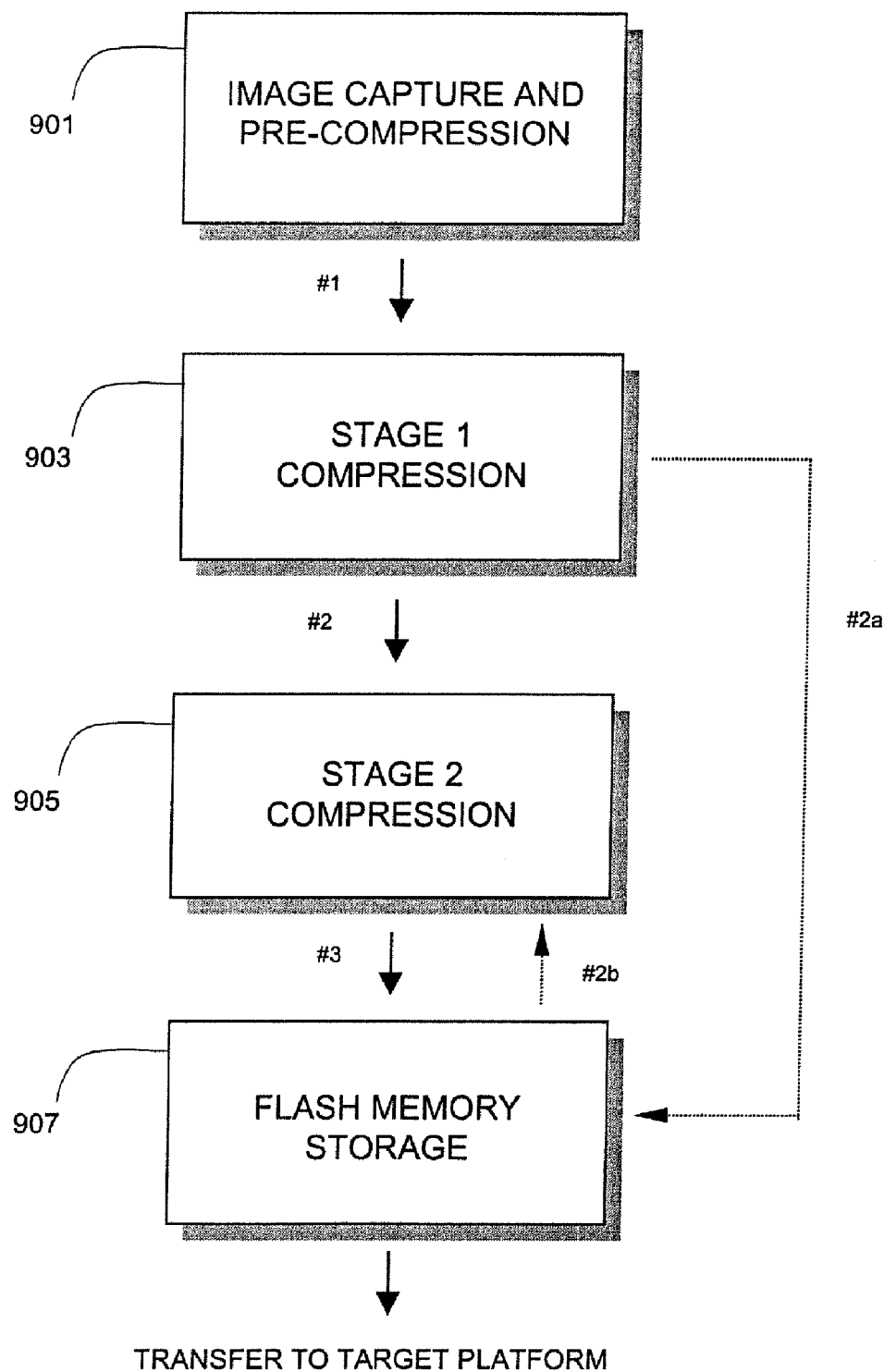
FIG. 9A is a flowchart illustrating progression of on-camera compression processing from a luminosity record to a state of being compressed for wireless transmission to a remote platform, in accordance with the present invention.

FIG. 9A is a flowchart illustrating the overall method. In particular, the figure shows the progression of on-camera compression processing from the luminosity record to the state of being compressed (approximately to $\frac{1}{20}^{th}$) for wireless transmission to a remote platform, where the remainder of the distributed processing renders JPEG2000 representations of the original pictures. The particular method steps are as follows.

The method begins with image capture and pre-compression, shown collectively as step 901. This step represents the beginning of a high-priority process, which continues in the RAM buffers to the stage 1 compression, shown at step 903, which also has a high priority. Depending upon the size and remaining resources in the RAM buffers, the partially-compressed record resulting from stage 1 compression may remain in RAM, or it may be written to flash memory, taking path #2a to step 907, as shown.

Next, processing progresses to stage 2 compression, shown at step 905. Here, processing drops to a lower priority (i.e., lower-priority task or thread). While the user is successively taking pictures, the task assigned to stage 2 compression will in fact "sleep" (i.e., remain idle). The task is awakened when the user is no longer continuously taking successive pictures. When there are no high-priority tasks running, however, stage 2 compression proceeds. If the stage 1-compressed record was temporarily stored in flash memory (i.e., from the previously-mentioned path #2a to step 907), then it is moved back into RAM for stage 2 compression (path #2b to step 905). When stage 2 compression has completed, the implementation preferably transfers the compressed record to flash memory until it may be transmitted for further remote processing.

2. Pre-Compression Processing

The pre-compression procedures begin following the image capture by the solid-state imaging sensors in the camera. Such sensors are overlaid with a Color Filter Array (CFA) that is a periodic color filter grid. For example, the even lines in the sensor could have alternating green and red filters, and the odd lines alternating blue and green filters. The image capture is a snapshot that produces a color record of the scene. However, only color is captured per pixel depending on the color filter overlaying that pixel.

The following three steps involve iterative image capturing that take place when the user presses (or partially presses) the camera button to take a snapshot:

1. Auto-exposure. This may be accomplished by either implementing a light meter that pre-adjusts the exposure for an acceptable level of luminosity, or by iteratively capturing images until the level of luminosity is acceptable. In the iterative-capture scenario, if the histogram of the picture contains too many pixels that are all white, the camera adjusts to darken the next quick capture.
2. Auto-focus. This requires a servo-control of the lens, which depends upon an algorithm that iteratively calculates a sharpness number based upon each quick capture.
3. Auto-white balance. The camera mimics the human eye in compensating for austere color variations due to contrasting light sources/exposures within the composition of the picture. Auto-white balance is performed to get good color balance among the gray-scaling.

The final image that is captured after the auto-exposure, auto-focus, and auto-white balance procedures is the luminosity record of the photograph. The following pre-compression steps are performed on the luminosity record after the image capture(s) is completed:

1. Noise smoothing, which corrects for bad pixels in the record.
2. Demosaic. Since the image sensor only captures a single color at each image pixel, the demosaic operation estimates the other two colors based on the available color values in that pixel's neighborhood.
3. If the GUV color representation is used (rather than YUV), then the following alternative steps are processed instead of the pre-compression steps 4-8 (pre-compression steps 4-8 would be deferred to a remote target platform rather than within the camera device):
   a. Non-linear mapping, or gamma correction, in which linear color space is converted to a power function representation. This is necessary because although color is linear in the physical world, the human eye perceives color brightness in a way that is more logarithmic.
   b. Color plane separation processing to GUV (see FIG. 3A) 323.
4. Color space conversion and gamma mapping—together map the device RGB values to industry-standard RGB values, such as the sRGB standard (International Electrotechnical Commission IEC/3WD 61966-2.1: Colour measurement and management in multimedia systems and equipment—Part 2.1: Default RGB color space—sRGB. This standard is available on the Internet at http://www.srgb.com/sRGBstandard.pdf):

a. Color space conversion involves matrix multiplication to convert device RGB values to new RGB values. This represents a linear mapping (since matrix multiplication leads to linear combinations of the device RGB values to generate the output RGB values).

b. Gamma mapping is a non-linear mapping wherein the linear color space is converted to a power function representation. This is necessary because although color is linear in the physical world, the human eye perceives color brightness in a way that is more logarithmic.

5. RGB color space to YUV conversion.
6. Sharpening of the Y plane.
7. Smoothing the U plane and the V plane. This involves performing low-pass filtering of the U and V planes, and helps minimize chroma errors introduced in the demosiac step.
8. Sub-sampling of the U and V planes. Whereas the Y plane represents luminance, the U plane and the V plane represent chrominance. Because the human eye is less sensitive to chrominance than luminance, a coarser-grained mapping of the U and V plane can be sampled at a coarser grain with minimal loss in image fidelity: this results in an implicit compression.

3. Stage 1 Compression Processing

Figure 9B:
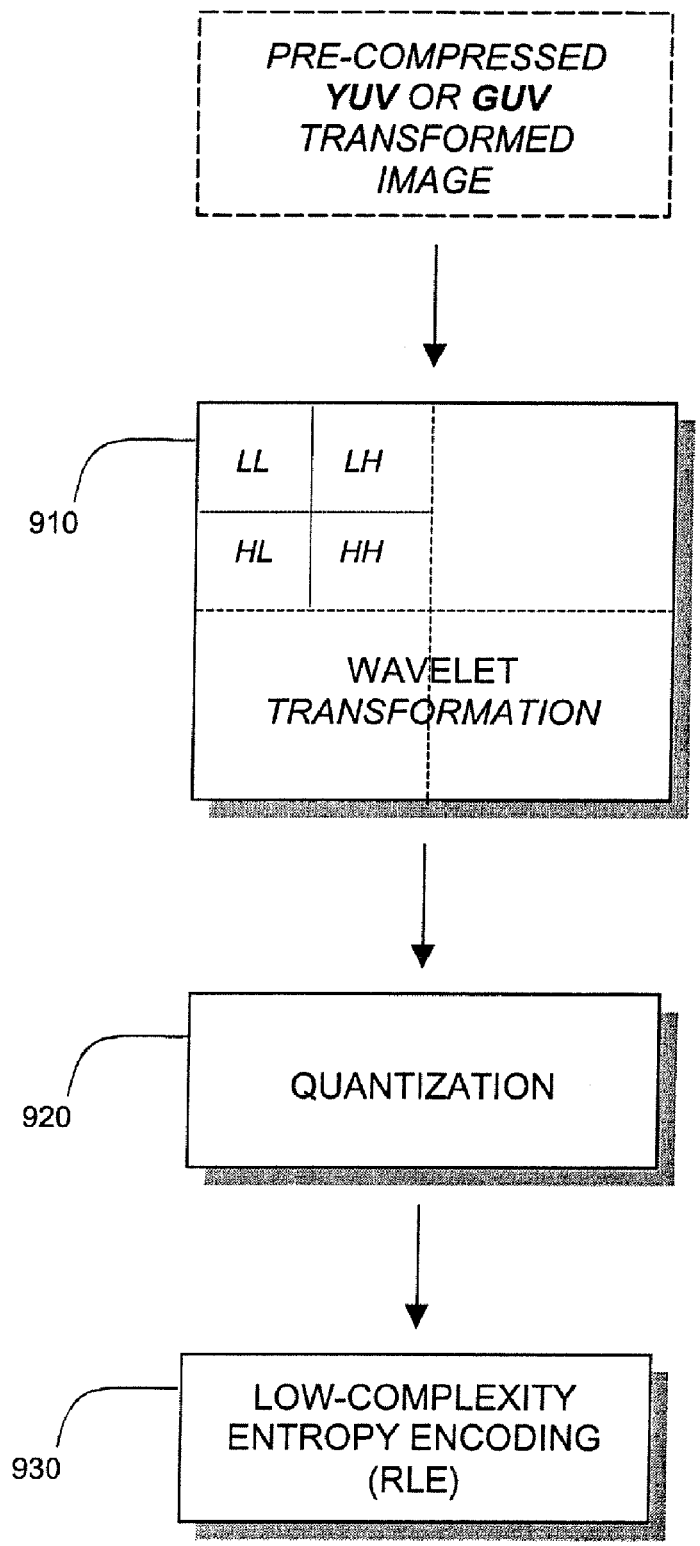
FIG. 9B is a block diagram illustrating stage 1 compression, in accordance with the present invention.

The purpose of an interim compression, the stage 1 compression, is to free up enough of the RAM buffer so it is sufficient to enable the user to take successive pictures. FIG. 9B, which illustrates stage 1 compression, begins with a pre-compressed luminosity record, implemented to either a YUV or a GUV format. In this stage the YUV representation is now reorganized, or transformed, for compression. The YUV image is transformed into a frequency domain from a spatial domain, 910. A frequency domain is more amenable to compression.

The preferred embodiment of this phase of compression begins with a Discrete Wavelet Transformation (DWT), although any discrete transformation technique could be applied; e.g., the Discrete Cosign Transformation (DCT) traditionally used for compressing toward the Joint Photographic Experts Group (JPEG) format. However, the Discrete Cosign Transformation often generates "pixelization" artifacts. DWT is more amenable to compressing and restoring pictures.

JPEG: see e.g., Nelson, M. et al., *The Data Compression Book*, Second Edition, chapter 11: Lossy Graphics Compression (particularly at pp. 326-330), M&T Books, 1996. Also see e.g., *JPEG-like Image Compression* (Parts 1 and 2), Dr. Dobb's Journal, July 1995 and August 1995, respectively (available on CD ROM as *Dr. Dobb's/CD Release* 6 from Dr. Dobb's Journal of San Mateo, Calif.). The disclosures of the foregoing are hereby incorporated by reference.

Figure 10A:
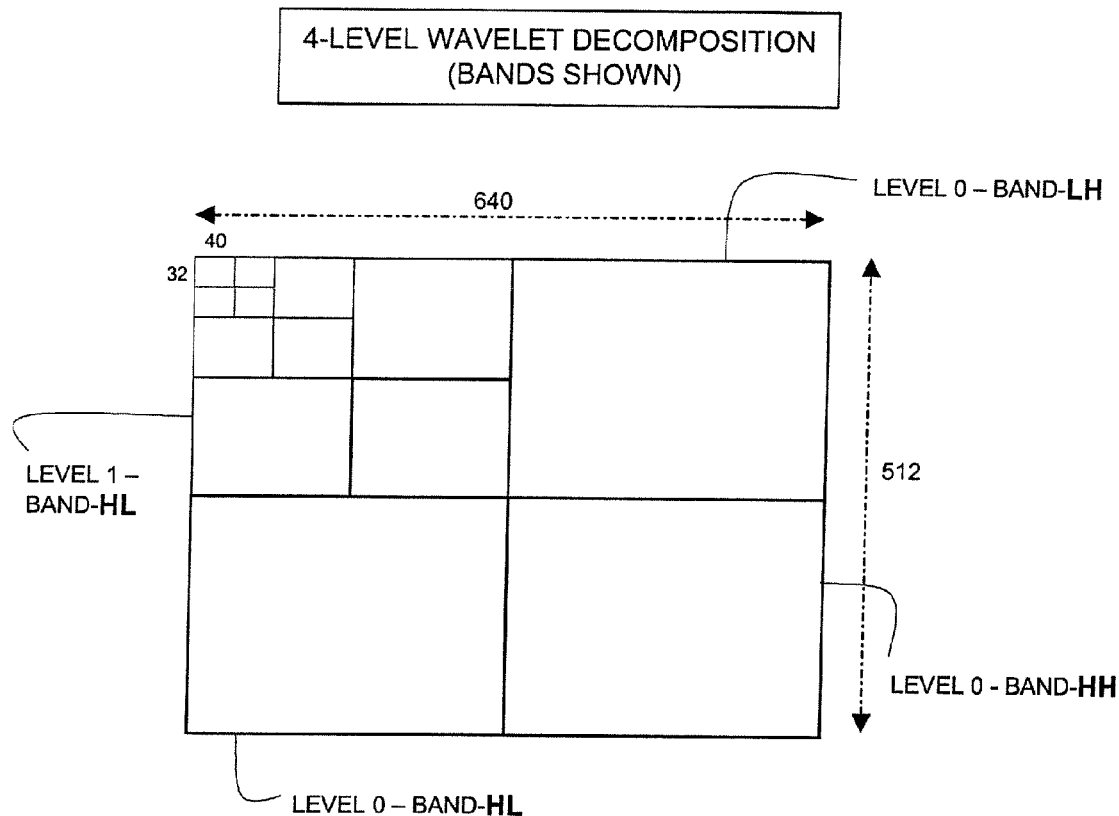
FIG. 10A is a block diagram illustrating 4-level wavelet decomposition.

The DWT 910 decomposes the image into the LL band, LH band, HL band, and HH band (LL=low frequency, low frequency; LH=low frequency, high frequency; HL=high frequency, low frequency; HH=high frequency, high frequency). Since the human eye is more sensitive to the lower frequencies, the LL band is further decomposed (by the DWT) to another block of the four-quadrant bands. This process, which is illustrated in FIG. 10A, is continued recursively for an arbitrary number of times: in the preferred embodiment, the recursion is four deep. At this point, the image has been transformed into bands.

Each color plane in each band is individually transformed by DWT, rendering it ready for an initial (small-step) quantization, 920. Quantization is typically the only lossy stage during compression. During quantization, most, or all, of the low-frequency bits are retained, but a percentage of the higher-frequency bits are discarded, as they are not as perceptible to the human eye. Each band is quantized (i.e., divided) by possibly a different quantization step size. For example, smaller step sizes are used for the lower-frequency bands and larger quantization step sizes are used for the higher-frequency bands. The step sizes are coded in the bit stream as header information so that the decoder can reverse the quantization by multiplying the pixels by the corresponding quantization step size. However, the recovery is only approximate. For example, if the quantization step size for band B, is Q=10, and a pixel value in that band is 124, the result of quantization is 124/10=12 (integer arithmetic is used during quantization). The decoder restores this number to (12*10)=120.

Quantization involves dividing the pixel values in a band by the band's quantization step size, and saving the result in a Sign-magnitude format. The most significant bit corresponds to the sign and the rest of the bits represent the magnitude. The Sign-magnitude format is required for the bit plane-coding scheme employed in the stage 2 compression. After a color plane is transformed, using the wavelet transform, and then quantized, it is ready for the stage 1 compression, 930.

Stage 1 compression is designed to be fast, but not necessarily efficient with respect to data size reduction. In other words, compression speed is traded for compression (i.e., output file) size reduction. The particular approach is as follows. Each "band" of the wavelet-transformed and quantized image is then decomposed into its bit planes, with the Most Significant Bit plane (MSB) coming first, and the Least Significant Bit plane (LSB) last. Coding for a band begins with the MSB (the sign plane), followed by the First Significant Bit plane (FSB). This is the first bit plane that is not all zero (i.e., there is at least one non-zero pixel in this bit plane). The FSB number for a band is recorded in the image header. Coding proceeds from the FSB, bit plane by bit plane, to the LSB.

Next, each bit plane is low-complexity entropy encoded, which is a fast encoding process. The working embodiment of this invention uses a run-length encoding (RLE) technique, 930. The specific operation is as follows. Assume each bit plane has N-bits (in a raster scan order). The header consists of N/8-bits, wherein each bit corresponds to 8 bits of image data. One of the following three decisions determines the compressed bit plane:

1. If the data bits corresponding to a header bit are all 0, then the bit is set to 0, and the corresponding data bits are not coded into the bit stream output. This scheme leads to a data size reduction if there are several (consecutive) 0s in the bit plane, which is typically the case.
2. If any of the 8 corresponding data bits are non-zero, then the header bit is set to 1, and all the data bits are coded into the bit stream output.
3. If a data-size increase for a bit plane results from the above scheme, then the original bit plane is coded into the bitstream with no compression, and the run-length coded bit plane is discarded. A single bit in a bit plane header can signify if run-length encoding was finally used or not.

Figure 10B:
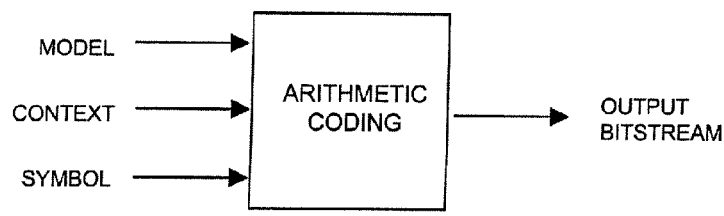
FIG. 10B is a block diagram illustrating arithmetic coding.
Figure 10C:
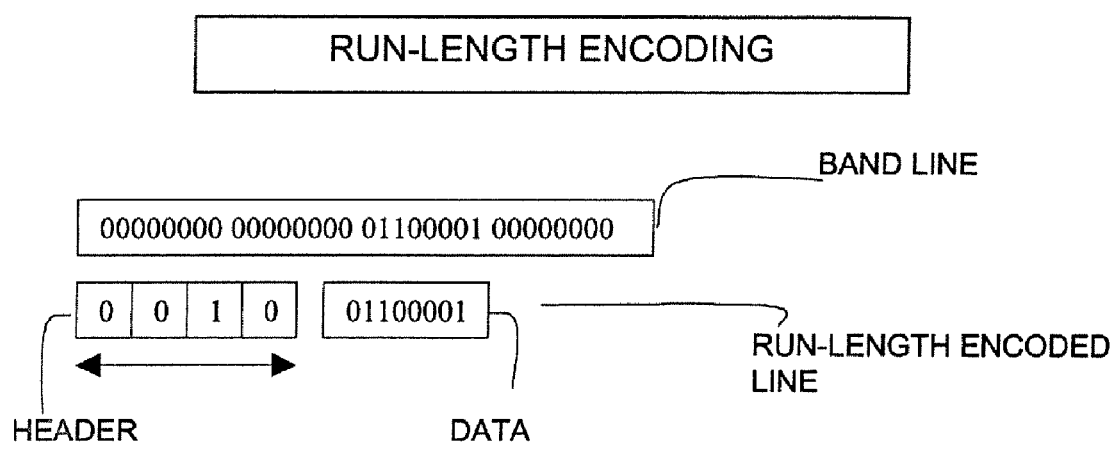
FIG. 10C is a block diagram illustrating run-length encoding.

Run-length encoding is illustrated in FIG. 10C. The figure shows a 32-pixel line in a band. The 32 pixels are grouped into units of 8. Compression involves sending 4-bit header information. Only the $3^{rd}$ bit is a 1, signifying that the corresponding 8-tuple is non-zero. Only this 8-tuple is coded in the bitstream. The data size reduction in this example is from 32 bits to 12 (4 header+8 data bits).

Those proficient in the art, will realize that there are several favors of run-length encoding, typically they encode a run of symbols as a symbol and a count. RLE is described in the patent, technical, and trade press; see, e.g., Zigon, Robert, *Run-Length Encoding*, Dr. Dobb's Journal, February 1989 (available on CD ROM as *Dr. Dobb's/CD Release* 6 from Dr. Dobb's Journal of San Mateo, Calif.), the disclosure of which is hereby incorporated by reference.

As another implementation of low-complexity entropy encoding, one could use Huffman coding, which would result in JPEG-like speeds, but not JPEG2000 file sizes. Huffman coding is described in the patent, technical, and trade press; see, e.g., Nelson, M. et al., *The Data Compression Book*, Second Edition, Chapters 4 and 5, M&T Books, 1996, the disclosure of which is hereby incorporated by reference.

For a description of JPEG2000, see e.g., International standard references for JPEG2000, ISO document: JPEG 2000 Part I, Final Committee Draft, Version 1.0; Source: ISO/IEC JTC1/SC29 WG1, JPEG 2000 Editor Martin Boliek, Co-editors Charilaos Christopoulos and Eric Majani. The disclosure of the foregoing is hereby incorporated by reference. A copy of the document is currently available on the Internet at www.jpeg.org/FCD15444-1.htm.

After the entire YUV (or other desired color space) record has been run-length encoded, that is, after a cycle of both the pre-compression and the stage 1 compression processing, the amount available from the camera's memory (RAM) buffer is increased (than would have been possible with uncompressed image data occupying the camera's buffer). This additional buffer memory, coupled with additional available processor resources (resulting from deferring deep compression), supports the user's ability to take more successive pictures or snapshots with minimum latency or delay. Moreover, as the preferred embodiment of the present invention employs a multi-threaded camera operating system, the user's ability to take a successive picture (in real-time) is assigned a higher priority than the task of the stage 2 compression, thereby ensuring that stage 2 compression does not interfere with user operation.

4. Stage 2 Compression Processing a. General

As previously described, stage 2 compression is a lower-priority task. In the currently-preferred embodiment, the task can run whenever all of the following conditions are true:

1. The user is not currently shooting any more pictures.
2. The user is not currently interfacing with the camera; e.g., entering user input.
3. A stage 1 compression task is not currently running.

In stage 2 compression, the encoded bands, or bit planes, are decompressed and then re-compressed more deeply to a 1:20 compression versus the 1:4 compression that stage 1 generated. Following decompression, supplemental quantization is optionally applied. Since the decompression subtask does not restore the file to its original state—it remains quantized, but could be more deeply quantized.

Stage 2 uses a higher-complexity encoding which generates a more efficient file size, but it is slower, and is therefore preferably assigned to be a lower-priority or lowest-priority task. Whereas stage 1 compressed files may or may not be stored in flash memory, stage 2 compressed files either persist in flash memory and/or are transmitted wirelessly for remote processing to a JPEG or JPEG2000 format. The currently-preferred implementation of high-complexity entropy encoding uses context modeling and arithmetic coding.

The context modeling approach used in the current embodiment is based on the approach described by Taubman and Zakhor (*Multirate 3-D subband coding of video*, D. Taubman and A. Zakhor, IEEE transactions on image processing, Vol. 3, No. 5, September 1994, pages 572-588), the disclosure of which is hereby incorporated by reference.

The arithmetic-coding approach is based on the multi-symbol arithmetic coding approach described by Bell et al; see e.g., T. C. Bell et al., *Text Compression, Section* 5.2, Prentice Hall, Englewood Cliffs, N.J., 1990, the disclosure of which is hereby incorporated by reference. However, rather than using multiple symbols, one could use only 2 symbols, 0 and 1. The stage 2 compression task does not consume considerable RAM buffer space, because it is done piecemeal: sequentially, each (stage 1-compressed) bit plane within a band is decompressed and recompressed before the next consecutive bit plane is processed.

b. Bit Plane Ordering

Stage 2 compression encoding is given a target size for each color plane. The processing for a color plane involves the following for each band:

1. Each bit plane in a band is decoded, with the FSB plane decoded first.
2. The bit plane is re-encoded with the bit plane re-coding scheme described below. The bit plane size and position information is saved.
3. Once all of the bit planes are encoded, then the bitstream is pared (this method of discarding excess bits is called "embedded quantization" in the literature). The preferred method of paring the bitstream is as follows. Suppose there are at most 15 bit planes. The system starts with bit plane 15 and accumulates the data size of bit plane 15 for all the bands, starting with bit plane 15 of the smallest LL band, followed by the corresponding LH, HL, and HH bands. This is then followed by the next smallest LL band, LH band, HL band, HH band, and so on. Note that the data size is 0, for those bands that do not have bit plane 15 (i.e., FSB is less than 15). The system then proceeds to accumulate the data sizes for bit plane 14. This process is continued until the target data size is reached. The remaining bit planes are discarded. There are other modes to prioritize the bit planes to reach the target plane size. Such modes are discussed by B. G. Haskell et al., *Digital Video: An introduction to MPEG*2, Chapman and Hall, New York, 1997, which is hereby incorporated by reference.

c. Bit Plane Encoding within a Band

1. The bit planes in a band are coded starting at the FSB plane and proceeding bit plane by bit plane to the LSB plane.
2. The following state information is maintained for each pixel in a band:
   a. sign for the pixel: The sign is obtained from the sign-bit plane.
   b. significance: significance is initially set to 0 (before coding for the band begins), and is set to 1 after the pixel is first coded as significant (i.e., after a useful non-zero value is transmitted for that pixel).
   c. refine: The pixel is said to be in "refinement" mode starting with the next bit plane after it becomes significant.
3. Arithmetic coding is used to code the bits in a bit plane. Arithmetic coding is illustrated in FIG. 10B. The block takes in the following three inputs and outputs bits into the output bitstream. Here, it suffices to view this as a blackbox. The following definitions reference FIG. 10B:

a. model: The model for coding a symbol could be any of the following:
   i. run: This model is used to code status of 8-tuples of pixels as described later.
   ii. significance: This model is used to code pixel significance.
   iii. sign: This model is used to code pixel sign.
   iv. refinement: This model is used to code refinement bits after the pixel becomes significant.
   v. generic.
b. context: The context is a number that is derived from the surround of a pixel. (surround refers to the immediate 3×3 surrounding neighborhood of a pixel. The 3 surrounding significance values define surround$_{sig}$, and the 3 surrounding sign and significance values define surround$_{sign}$).
c. symbol: In the currently-preferred implementation the symbols are binary: 0 or 1. The symbols have the following significance based on the model used:
   i. model run: 1 implies a run of zeroes, and 0 implies no run.
   ii. significance: 1 implies a newly significant pixel, 0 implies the opposite.
   iii. sign: 1 implies a negative sign, 0 implies positive.
   iv. refinement: 1 implies that this is a refinement pixel, 0 implies not.
   v. generic: 1 implies the symbol being coded has a literal value of 1, 0 implies 0.
d. Detailed Methodology for Coding the Bit Planes of a Band The FSB is coded first. The pixels are visited 8 at a time (i.e., in 8-tuples) in a raster scan order. If the significance of the current 8-tuple of pixels, and the corresponding 8-tuples in the row above and below are all 0, it is defined that one has a run. Coding for a RUN is different from coding a NON-RUN.

Coding a RUN:

If the bit plane to be coded has no newly-significant pixels to contribute to the current 8-tuple, one has a run of zeroes, so the following input is provided to the arithmetic coder: (model=run, context=0, symbol=1). If one does have at least one newly significant pixel in the 8-tuple, then one would code the triplet (value: model=run, context=0, symbol=0).

This run-length encoding scheme has the effect of reducing the number of symbols that has to be coded by the arithmetic coder (i.e., assuming that there are several runs of zeroes, which is typically the case. In such cases, there is no need to code the 8-tuple further). This approach of using run-length encoding at such an early stage of encoding the bit planes of a band gives stage 2 compression a big performance boost.

One now proceeds to code the bits in the 8-tuple.
1. The first significant pixel in the 8-tuple is identified—this will be a number between 0 and 7, i.e., a number between 0 and 7. This is a 3-bit number. Each bit is coded as the triple (value: model=generic, context=0, symbol=bit).
2. Now that the first significant pixel is known, the state of the pixel is set to significant.
3. The pixels that follow this significant pixel are coded as follows:
   a. The pixel value is coded as the triple (value: model=significant, context=f$_{sig}$(surround$_{sig}$), symbol=pixel).
   b. If the pixel has become significant, its sign is transmitted as the triple (model=sign, context=f$_{sign}$(surround$_{sign}$), symbol=sign of the pixel), and its significance state is updated to 1 (i.e., it is no longer insignificant).

Coding a NON-RUN:

If one does not have a RUN, then one codes the 8-tuple, one pixel after the other, as follows:
1. If this pixel was already significant, then it is in a refinement mode, and it is coded with the triple (model=refine, context=f$_{refine}$(surround$_{sig}$), symbol=pixel). The pixel's refinement state is set to 1 (i.e., it has moved from newly significant to refinement mode).
2. If this pixel is newly significant, the pixel value is coded as the triple (model=significant, context=f$_{sig}$(surround$_{sig}$), symbol=pixel). If the pixel has become significant, its sign is transmitted as the triple (model=sign, context=f$_{sign}$(surround$_{sign}$), symbol=sign), and its significance state is updated to 1 (i.e., it is no longer insignificant).
   f: the functions, f$_{sig}$, f$_{sign}$, and f$_{refine}$ map a surround to a context. This is typically a many-to-one mapping, i.e., several surrounds can map to the same number. Such a mapping is described as "conditioning" in the literature (for instance, see Taubman and Zakhor, referred to earlier). The advantage of such mappings is to reduce the number of contexts that the system has to contend with.

5. Server-Side JPEG2000 Processing

The encoded picture is transmitted wirelessly to a server, where it is transcoded to JPEG2000. Transcoding for JPEG2000 involves decoding the bit planes and re-encoding them with the JPEG2000-specific bit plane coding method. This method codes each bit plane in 3 passes. Further, it does not employ the run-length encoding scheme that is used to pare down the number of bits coded. Together, these two factors contribute to much lower performance. However, since the JPEG2000 process runs on powerful backend servers, this loss of performance is not perceived by the user. Furthermore, the user gets the picture in an industry-standard format, that can be manipulated by other systems, for display, etc.

While the invention is described in some detail with specific reference to a single-preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. A method for compressing digital images upon capture at a digital camera device, the method comprising:

capturing a sequence of digital images;

applying a first fast compression technique to the sequence of digital images to temporarily compress at least one of the digital images from the sequence of digital images upon capture;

storing the sequence of digital images in an image buffer, wherein the at least one of the digital images is compressed with the first fast compression technique;

deferring a second, thorough compression technique to a period of time when a user is not providing additional input to the digital camera device; and at the period of time, decompressing the at least one of the digital images that were temporarily compressed and applying the second, thorough compression technique, on a low-priority thread subordinate to a high-priority thread to the entire sequence of digital images after tasks in the high-priority thread have been processed in a multi-threaded execution environment of the digital camera device.

2. The method of claim 1, wherein first fast compression technique requires fewer processing resources for completion than the second, thorough compression technique.

3. The method of claim 1, wherein the digital camera device supports multithreaded execution and applying the second, thorough compression technique occurs as a background execution thread.

4. The method of claim 1, wherein the digital camera device supports multithreaded execution and applying the first fast compression technique occurs as a higher-priority thread.

5. The method of claim 1, wherein the sequence of digital images comprises a series of images captured in rapid succession.

6. The method of claim 1, further comprising:
deleting a digital image, after the digital image is temporarily compressed and the temporarily compressed digital image is stored in the image buffer.

7. The method of claim 1, further comprising after a given digital image is temporarily compressed:
storing a compressed file of the given digital image in a RAM buffer, and
transferring the compressed file from the RAM buffer to flash memory.

8. The method of claim 7, wherein the compressed file is transferred when the RAM buffer is nearly exhausted.

9. The method of claim 1, further comprising:
capturing each digital image as a luminosity record; and
applying pre-compression to each luminosity record, in preparation for compression.

10. The method of claim 9, wherein the pre-compression comprises selected ones of noise smoothing and de-mosaicing.

11. A digital camera device with improved latency time between acquiring pictures, the digital camera device comprising:
an image capturing system for capturing a series of digital images to an image buffer;
a first rapid compression module for temporarily compressing at least some of the series of digital images upon capture, thereby freeing up available storage in the image buffer;
a decompression module to decompress the temporarily compressed digital images; and
a second thorough compression module for deferring a relatively-thorough compression to a period of time when a user is not providing additional input and compressing the at least some of the series of digital images more thoroughly than that provided by the first rapid compression module at the period of time, wherein the compression of the at least some of the series of digital images more thoroughly occurs in a low-priority thread subordinate to a high-priority thread after tasks in the high-priority thread have been processed in a multi-threaded execution environment of the digital camera device.

12. The digital camera device of claim 11, wherein the first rapid compression module employs a relatively-fast compression technique that requires fewer processing resources for completion than the second thorough compression module.

13. The digital camera device of claim 11, wherein the digital camera device supports multithreaded execution and wherein the second thorough compression module employs a compression technique that operates as a background execution thread.

14. The digital camera device of claim 11, wherein the at least some of the series of digital images comprises successive pictures rapidly captured at the digital camera device.

15. The digital camera device of claim 11, further comprising:
a RAM buffer for storing a given digital image that has been temporarily compressed.

16. The digital camera device of claim 11, wherein a digital image is deleted from the image buffer, after the digital image is temporarily compressed and the temporarily compressed digital image is stored in the image buffer.

17. The digital camera device of claim 11, wherein the first rapid compression module further includes a module to apply pre-compression to an image captured as a luminosity record, in preparation for compression.

18. The digital camera device of claim 17, wherein the pre-compression comprises selected ones of noise smoothing and de-mosaicing.

* * * * *